(12) United States Patent
LeMay et al.

(10) Patent No.: US 12,639,072 B2
(45) Date of Patent: May 26, 2026

(54) REDUCING INSTRUMENTATION CODE BLOAT AND PERFORMANCE OVERHEADS USING A RUNTIME CALL INSTRUCTION

(71) Applicant: Intel Corporation, Santa Clara, CA (US)

(72) Inventors: Michael LeMay, Hillsboro, OR (US); Dan Baum, Haifa (IL); Joseph Cihula, Hillsboro, OR (US); Joao Batista Correa Gomes Moreira, Hillsboro, OR (US); Anjo Lucas Vahldiek-Oberwagner, Portland, OR (US); Scott Constable, Portland, OR (US); Andreas Kleen, Portland, OR (US); Konrad Lai, Vancouver, WA (US); Henrique de Medeiros Kawakami, Seattle, WA (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/853,087

(22) Filed: Jun. 29, 2022

(65) Prior Publication Data

US 2024/0004659 A1 Jan. 4, 2024

(51) Int. Cl.
*G06F 9/30* (2018.01)
(52) U.S. Cl.
CPC .................................. *G06F 9/3016* (2013.01)
(58) Field of Classification Search
CPC ............... G06F 9/3005; G06F 9/30054; G06F 9/30058; G06F 9/30061; G06F 9/30076; G06F 9/30079; G06F 9/30101; G06F 9/323; G06F 9/3861; G06F 9/3865; G06F 11/36; G06F 11/362; G06F 11/3624; G06F 11/3644

See application file for complete search history.

(56) References Cited

U.S. PATENT DOCUMENTS 9,129,062 B1 * 9/2015 Adams ................ G06F 11/3644
10,157,277 B2 12/2018 LeMay et al.
2011/0047357 A1 * 2/2011 Stempel .............. G06F 9/30072
712/E9.016

(Continued)

OTHER PUBLICATIONS

Intel Corporation, "A Technical Look at Intel's Control-flow Enforcement Technology," Jun. 13, 2020, 5 pages, Retrieved from the Internet on May 4, 2022 at URL: intel.com/content/www/us/en/developer/articles/technical/technical-look-control-flow-enforcement-technology.html.

*Primary Examiner* — Jyoti Mehta
*Assistant Examiner* — Kasim Alli
(74) *Attorney, Agent, or Firm* — Nicholson De Vos Webster & Elliott LLP

(57) ABSTRACT

Techniques for an instruction for a Runtime Call operation are described. An example apparatus comprises decoder circuitry to decode a single instruction, the single instruction to include a field for an identifier of an opcode, the opcode to indicate execution circuitry is to execute a no operation when a runtime call destination equals a predetermined value; and execute an indirect call with the runtime call destination as a destination address when the runtime call destination does not equal the predetermined value. Other examples are described and claimed.

30 Claims, 20 Drawing Sheets

(56)            References Cited

U.S. PATENT DOCUMENTS

| | | | |
|---|---|---|---|
| 2013/0246747 A1* | 9/2013 | Gainey, Jr. ............ | G06F 9/3005 |
| | | | 712/205 |
| 2016/0179546 A1* | 6/2016 | Yamada .................... | G06F 8/30 |
| | | | 712/240 |
| 2016/0378499 A1* | 12/2016 | Burger .................. | G06F 9/3806 |
| | | | 712/234 |
| 2017/0185803 A1* | 6/2017 | Shanbhogue ......... | G06F 21/123 |
| 2020/0409711 A1 | 12/2020 | Constable et al. | |
| 2022/0207187 A1 | 6/2022 | Constable et al. | |

* cited by examiner

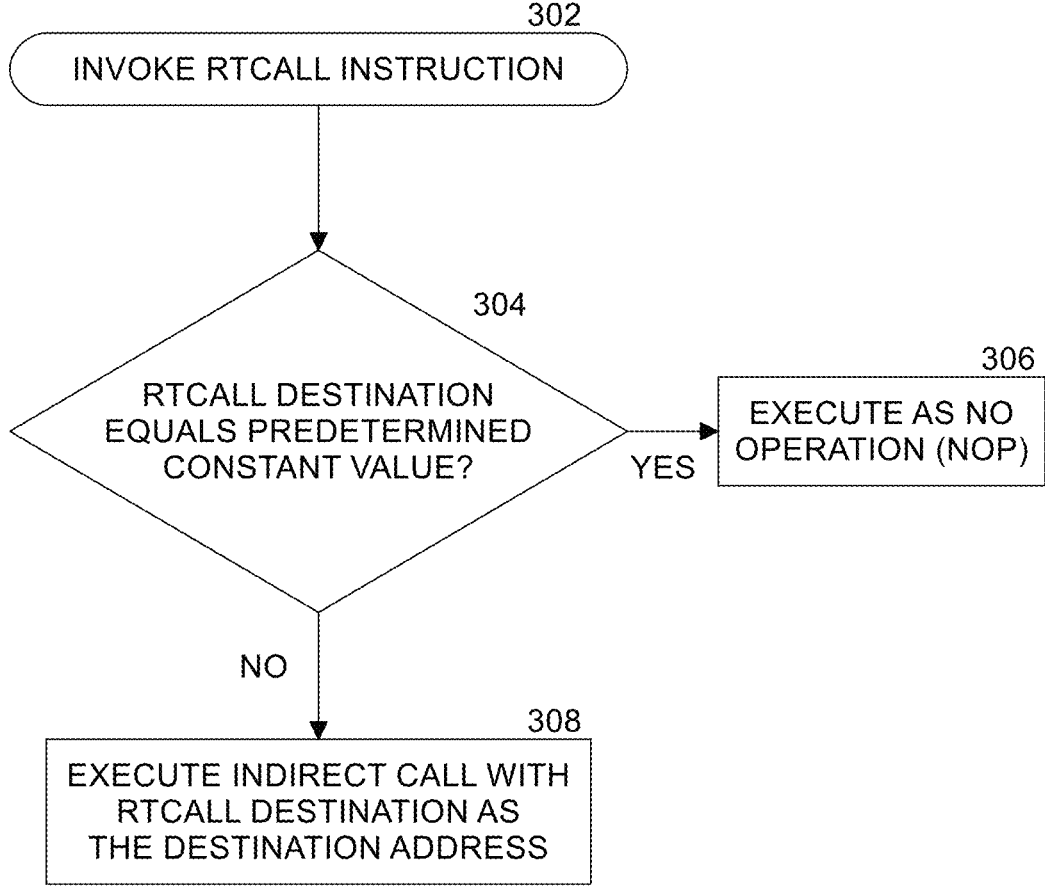
302
INVOKE RTCALL INSTRUCTION
304
RTCALL DESTINATION
EQUALS PREDETERMINED
CONSTANT VALUE?
306
EXECUTE AS NO
OPERATION (NOP)
YES
NO
308
EXECUTE INDIRECT CALL WITH
RTCALL DESTINATION AS
THE DESTINATION ADDRESS
300
FIG. 3

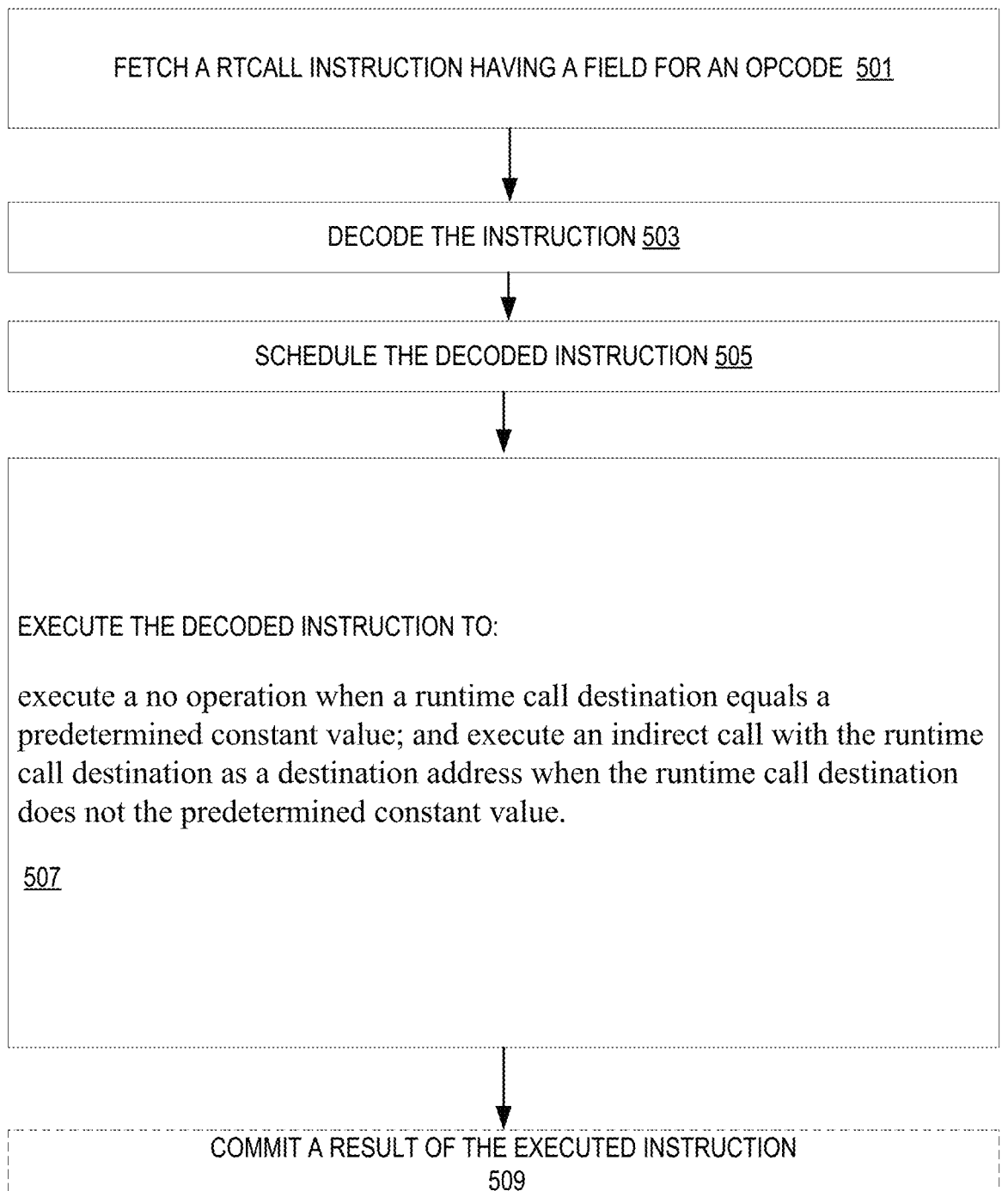

FETCH A RTCALL INSTRUCTION HAVING A FIELD FOR AN OPCODE  501

DECODE THE INSTRUCTION 503

SCHEDULE THE DECODED INSTRUCTION 505

EXECUTE THE DECODED INSTRUCTION TO:

execute a no operation when a runtime call destination equals a predetermined constant value; and execute an indirect call with the runtime call destination as a destination address when the runtime call destination does not the predetermined constant value.

507

COMMIT A RESULT OF THE EXECUTED INSTRUCTION
509

FIG. 5

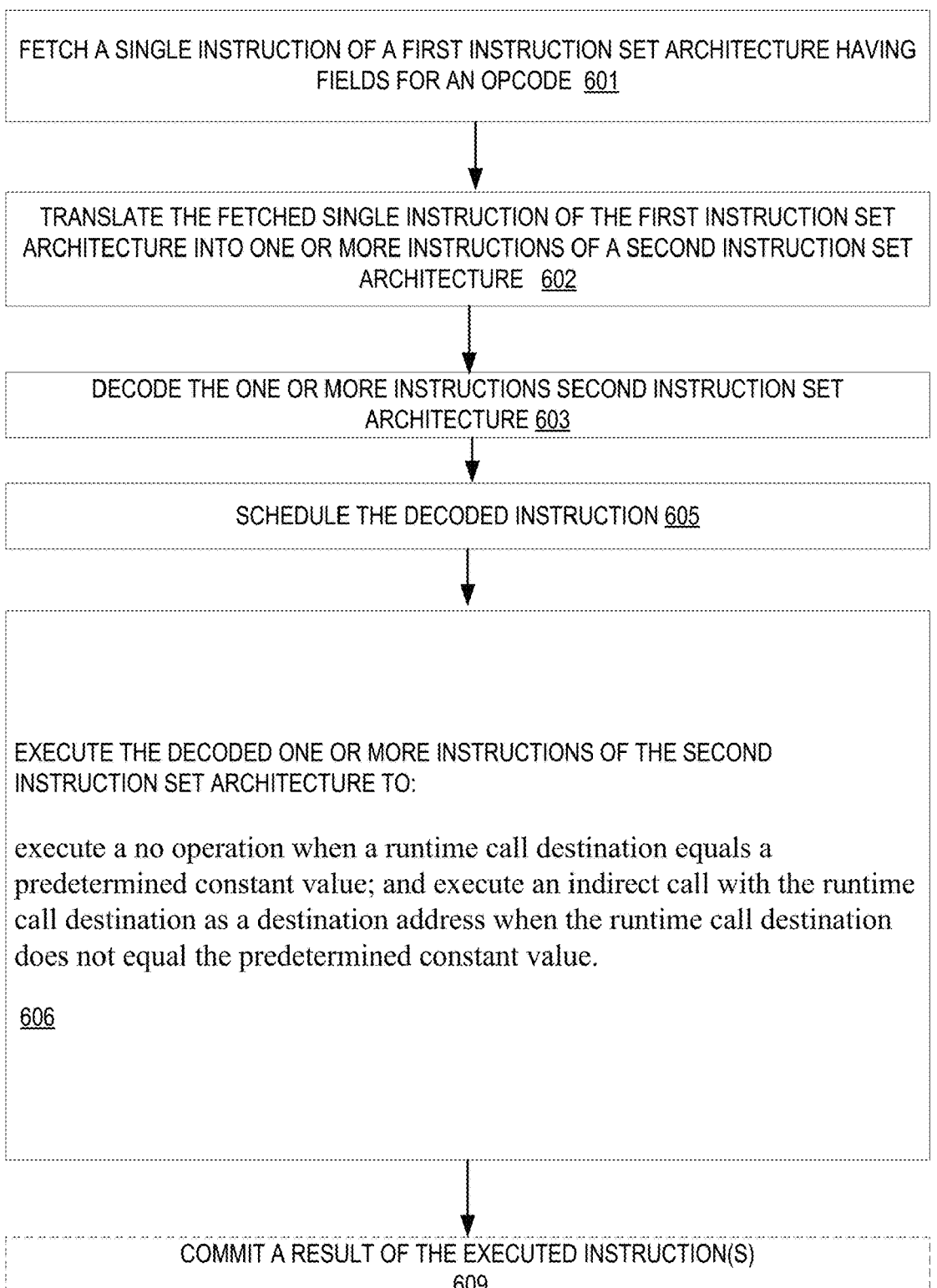

FETCH A SINGLE INSTRUCTION OF A FIRST INSTRUCTION SET ARCHITECTURE HAVING FIELDS FOR AN OPCODE 601

TRANSLATE THE FETCHED SINGLE INSTRUCTION OF THE FIRST INSTRUCTION SET ARCHITECTURE INTO ONE OR MORE INSTRUCTIONS OF A SECOND INSTRUCTION SET ARCHITECTURE 602

DECODE THE ONE OR MORE INSTRUCTIONS SECOND INSTRUCTION SET ARCHITECTURE 603

SCHEDULE THE DECODED INSTRUCTION 605

EXECUTE THE DECODED ONE OR MORE INSTRUCTIONS OF THE SECOND INSTRUCTION SET ARCHITECTURE TO:

execute a no operation when a runtime call destination equals a predetermined constant value; and execute an indirect call with the runtime call destination as a destination address when the runtime call destination does not equal the predetermined constant value.

606

COMMIT A RESULT OF THE EXECUTED INSTRUCTION(S) 609

FIG. 6

702
INVOKE RTCALL INSTRUCTION

704
RTCALL DESTINATION
EQUALS PREDETERMINED
CONSTANT VALUE?

YES

706
EXECUTE AS NO
OPERATION (NOP)

NO

708
SET RTRET DESTINATION
TO ADDRESS OF NEXT INSTRUCTION
AFTER THIS RTCALL INSTRUCTION

710
SET INSTRUCTION POINTER
TO RTCALL DESTINATION

700

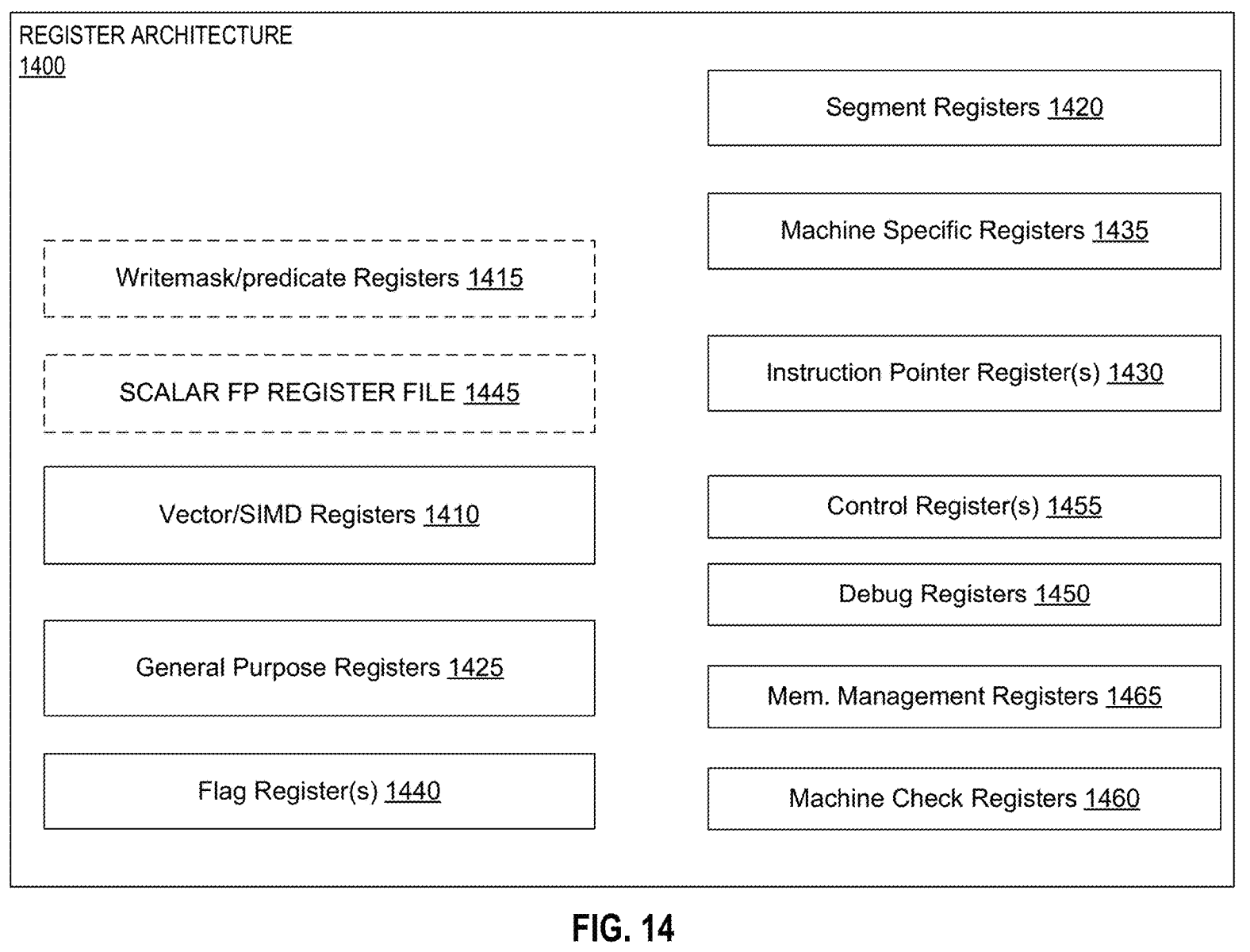

REGISTER ARCHITECTURE 1400

Writemask/predicate Registers 1415

SCALAR FP REGISTER FILE 1445

Vector/SIMD Registers 1410

General Purpose Registers 1425

Flag Register(s) 1440

Segment Registers 1420

Machine Specific Registers 1435

Instruction Pointer Register(s) 1430

Control Register(s) 1455

Debug Registers 1450

Mem. Management Registers 1465

Machine Check Registers 1460

FIG. 14

REDUCING INSTRUMENTATION CODE BLOAT AND PERFORMANCE OVERHEADS USING A RUNTIME CALL INSTRUCTION

BACKGROUND

Software instrumentation for usages such as memory safety enforcement, control flow integrity checking, code profiling, tracing, race detection, fuzzing, and user-mode trusted runtimes can lead to substantial code bloat and performance overheads. For example, Hardware Address Sanitizer (HWASan) is sometimes used for enforcing memory safety, and Control Flow Guard (CFG) is sometimes used for enforcing forward-edge control flow integrity (CFI). These usages currently depend on CALL instructions with relative offsets to instrumentation handler functions. This forces the use of restricted application binary interfaces (ABIs) to deal with the limitation of relative code offsets not being able to encode any distance greater than 2 gigabytes (GB) from the current instruction. Even within that range, many of those CALL instructions are distant from the instrumentation routines, so they use four-byte offsets, hence resulting in five-byte CALL instructions overall. This can lead to substantial code bloat.

There is also no way to disable the CALL instructions used for instrumentation, which results in them always being taken regardless of whether the instrumentation is needed for a particular program run. This also prevents statistical sampling via instrumentation, which is useful for reducing overheads.

BRIEF DESCRIPTION OF DRAWINGS

Various examples in accordance with the present disclosure will be described with reference to the drawings, in which:

FIG. 3 is a flow diagram of a method to process a Runtime Call instruction in one implementation.

FIG. 5 is a flow diagram of a method to process the Runtime Call instruction in one implementation.

FIG. 6 is a flow diagram of another method to process the Runtime Call instruction in one implementation.

FIG. 14 is a block diagram of a register architecture according to some examples.

DETAILED DESCRIPTION

Figure 1:
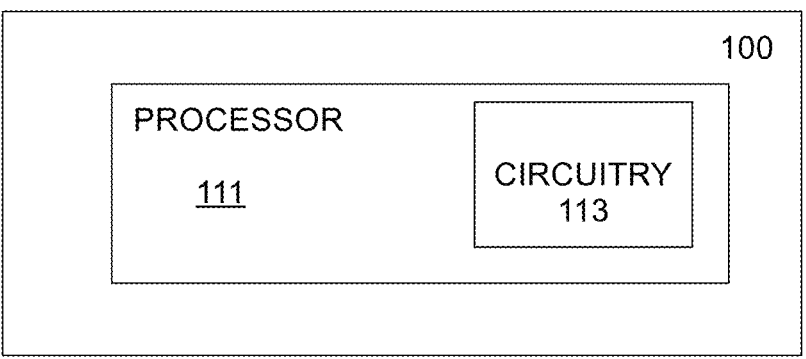
FIG. 1 is a block diagram of a computing system in one implementation.

The present disclosure relates to methods, apparatus, systems, and non-transitory machine-readable storage media for a new Runtime Call (RTCALL) operation in an instruction set of a computing system. An implementation of the new RTCALL operation unconditionally calls an instrumentation handler at a predefined address (to save the code space otherwise required to embed the relative displacement of the handler) and saves the address of the subsequent instruction into a register rather than on a stack/shadow stack, to avoid associated memory access performance overheads. The RTCALL instruction may be rapidly enabled or disabled via a user mode model specific register (MSR) to support disabling instrumentation for selected program runs and to provide statistical checks.

According to some examples, the technologies described herein may be implemented in one or more electronic devices. Non-limiting examples of electronic devices that may utilize the technologies described herein include any kind of computing system, mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, disaggregated server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide an instruction set for a RTCALL operation.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

A variety of forms of software instrumentation are used in existing computing systems, and many of them require invoking a software memory check handler (e.g., a check routine) for memory accesses to verify that they are safe. For example, the well-known Hardware-assisted Address Sanitizer (HWASan) memory safety enforcement mechanism inserts instrumented code into a program, including calls to the software memory check handler to check memory tags (where a memory tag is included in a memory pointer along with an address). The tag in the pointer is required to match the pointer associated with all granules accessed by the processor for that memory access to be permitted. Otherwise, an exception is generated.

In existing computing systems, CALL instructions are used to invoke tag check routines. However, this approach imposes at least several drawbacks. One drawback is code bloat due to needing to include a relative displacement from the CALL instruction to the software handler. This often results in the CALL instruction consuming a total of five bytes to fit a 32-bit displacement. Most memory accesses in the program and libraries are preceded by such CALLs, which results in a large amount of code space being consumed by the instrumentation CALL instructions. Another drawback is that even a 32-bit displacement (the maximum size supported in processors supporting the X86 instruction set architecture (ISA), such as those available from Intel Corporation) is insufficient for many workloads with large codebases such that not all the memory accesses are within 2 GB of the tag check routines. This can necessitate the use of even larger and slower code sequences to invoke the tag check routines. Another drawback is that each CALL instruction pushes a return address to the stack, and that return address is popped off the stack later. If a Control Flow Enforcement Technology (CET) shadow stack is enabled, a copy of the return address is accessed on the shadow stack, which adds further overheads. Performing all these memory accesses frequently and in rapid succession in addition to the memory accesses that are being checked by the instrumentation may be particularly difficult for the processor to execute efficiently.

A further drawback is that there is no efficient way to disable the instrumentation CALL instructions when the instrumentation is unneeded. A still further drawback is that even if statistical checks are desired (that is, the instrumentation should be invoked only infrequently), the CALL and corresponding return (RET) instructions will still always be invoked. Thus, even memory accesses that are intended to be left unchecked will still incur the overhead of a CALL/RET roundtrip. Another drawback is that register save and restore instructions and extra instructions for computing inputs to the tag check routines (e.g., the address of the access), further increase code size and performance overhead.

To concretely illustrate the code bloat drawbacks described above, consider the following sample code sequences. Table 1 shows an example of simple C source code that allocates a single heap allocation and performs a single store to the heap.

TABLE 1

```
int *heap_arr;
int main( ) {
    heap_arr = (int *)malloc(100);
    heap_arr[6] = 4;
    return 0;
}
```

Table 2 is an example of corresponding assembly code of the sample code of Table 1 generated for a large code model (with extra annotations), which can support relative displacements exceeding those that can be encoded in 32 bits, which is the requirement for the small code model. The small code model would be somewhat more efficient than this in supported programs, but it would still impose substantial code bloat due to 32-bit displacements often being required for each CALL instruction to invoke a tag check handler.

TABLE 2

```
----------------------------------------------------------------
.L0$pb:
    leaq     .L0$pb(%rip), %rax
// Extra register consumed to support large code model address computations, which leads
to additional performance overheads due to fewer registers remaining for other data:
    movabsq     $_GLOBAL_OFFSET_TABLE_-.L0$pb, %rbx
    addq    %rax, %rbx
// Extra overhead even for invoking other functions not directly related to instrumentation
due to the large code model being required to accommodate instrumentation in some
programs:
    movabsq     $malloc@GOT, %rax
    movl    $100, %edi
    callq    *(%rbx,%rax)
.Ltmp0:
    movq    %rax, %r15
    movabsq     $heap_arr@GOT, %rax
    movq    (%rbx,%rax), %r14
// Extra register consumed to perform large code model code address computation for tag
check routine:
    movabsq     $_hwasan_store8@GOT, %rax
    movq    %r14, %rdi
// Check that access to heap_arr global variable is safe:
    callq    *(%rbx,%rax)
.Ltmp1:
// Store pointer returned by malloc into heap_arr global variable:
    movq    %r15, (%r14)
    leaq    24(%r15), %rdi
    movabsq     $_hwasan_store4@GOT, %rax
// Check that access to heap_arr[6] is safe:
    callq     *(%rbx,%rax)
.Ltmp2:
// Store the number 4 to heap_arr[6]:
    movl    $4, 24(%r15)
----------------------------------------------------------------
```

The overheads needing to spill and fill additional registers surrounding invocations of tag check routines are illustrated in the sample code of Table 3.

TABLE 3

```
----------------------------------------------------------------
int f( ) {
    int x1 = 1;
    int x2 = 2;
    int x3 = 3;
    heap_arr[6] += x1 + x2 + x3; // referencing the same heap_arr variable as main
}
----------------------------------------------------------------
```

The assembly code corresponding to compiling the code of Table 3 has been omitted for brevity, but the assembly code includes a large number of required spills and fills (each of which is termed a "reload" by the compiler). The example assembly code totals 80 instructions, of which 13 instructions are spills and 20 instructions are fills. This is unoptimized code resulting in these significant overheads, but even optimized code can suffer from increased spills and fills.

The technology described herein overcomes the drawbacks noted above by shifting from a reentrant call/return semantics for invoking the tag check routines that makes use of the stack in the same way as legacy code into a non-reentrant "runtime call/return" semantics that avoids storing return addresses on the stack.

Some examples disclosed herein provide technology for a RTCALL instruction of an instruction set of an ISA of a computing system.

With reference to FIG. 1, an example of a computing system 100 may include a processor 111 to perform Runtime Call (RTCALL) operations that include at least a RTCALL operation, and circuitry 113 coupled to processor 111 to, in response to a single processor instruction, cause processor 111 to perform the RTCALL operation. For example, each of the source inputs may include one or more input arguments for a subsequent RTCALL operation. For example, the various inputs and indications may be included in the instruction itself (e.g., through the opcode, explicit fields of the instruction, pre-determined or implicit inputs/indications, etc.), or the instruction may explicitly or implicitly point to the information that identifies the various inputs and indications. Similarly, destination locations for the one or more results may be explicit operands of the single processor instruction or may be implicit locations (e.g., pre-determined registers or memory locations). For example, in response to the single processor instruction, circuitry 113 may be further configured to cause processor 111 to store the one or more results of the RTCALL operation in a location indicated by the single processor instruction.

In one example, in response to the single processor instruction, circuitry 113 may be further configured to cause processor 111 to execute a no operation (NOP) when a runtime call destination equals a predetermined constant value (such as zero or a known invalid memory address); and execute an indirect call with the runtime call destination as a destination address when the runtime call destination does not equal the predetermined constant value (such as zero or a known invalid memory address). An indirect call obtains a destination (code) address for a function from a register or a memory location, and then invokes that function. The indirect call processing may save a return address for the current call site onto the stack and optionally a shadow stack, or into a link register.

Figure 21:
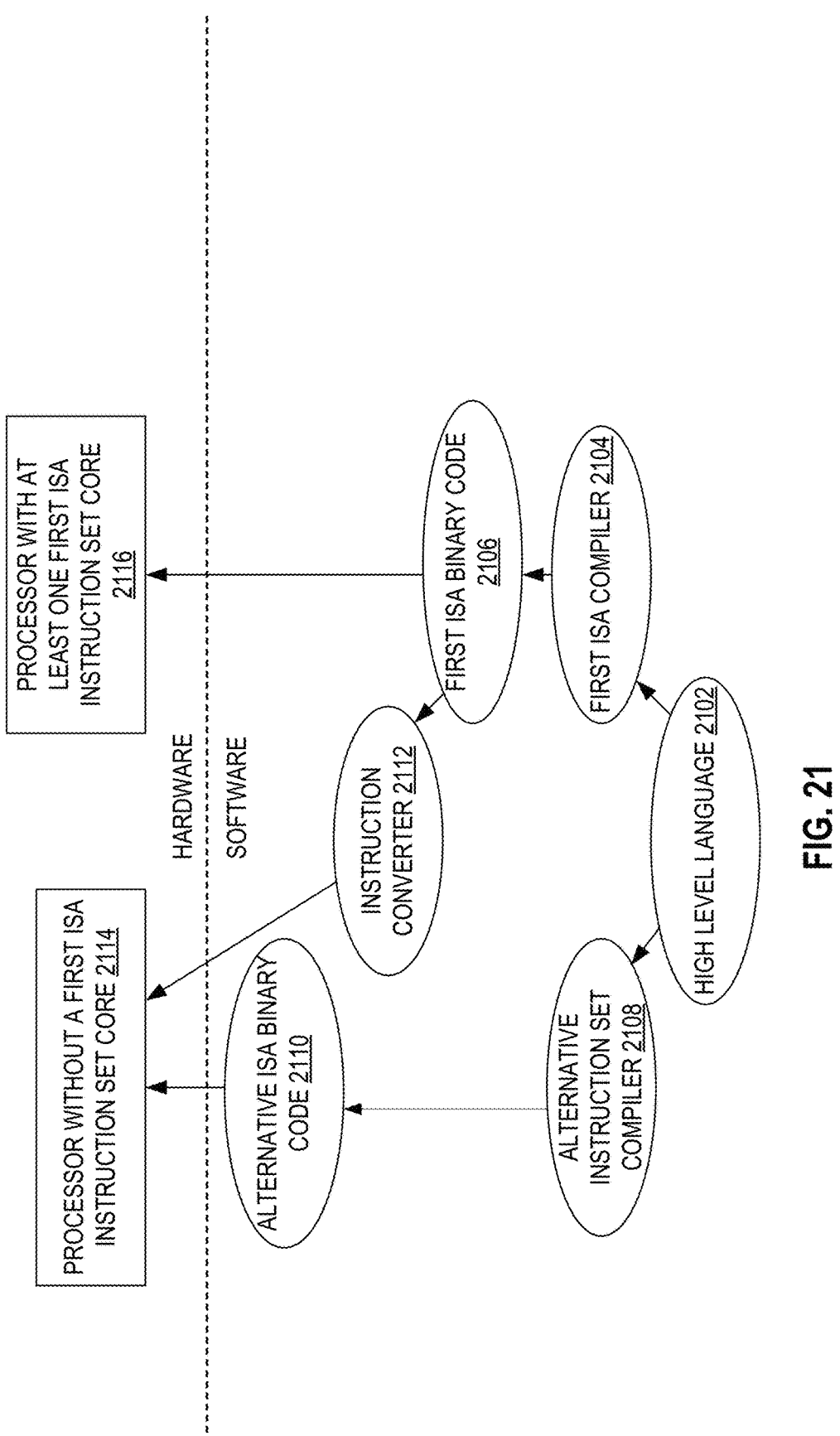
FIG. 21 is a block diagram illustrating the use of a software instruction converter to convert binary instructions in a source instruction set architecture to binary instructions in a target instruction set architecture according to examples.

For example, processor 111 may be implemented as any of the processors described below. Circuitry 113 may be incorporated in multiprocessor system 1000, processor 1070, processor 1015, coprocessor 1038, and/or processor/coprocessor 1080 (FIG. 10), processor 1100 (FIG. 11), core 1290 (FIG. 12B), execution units 1262 (FIGS. 12B and 13), and architecture core 2116 (FIG. 21).

Figure 2:
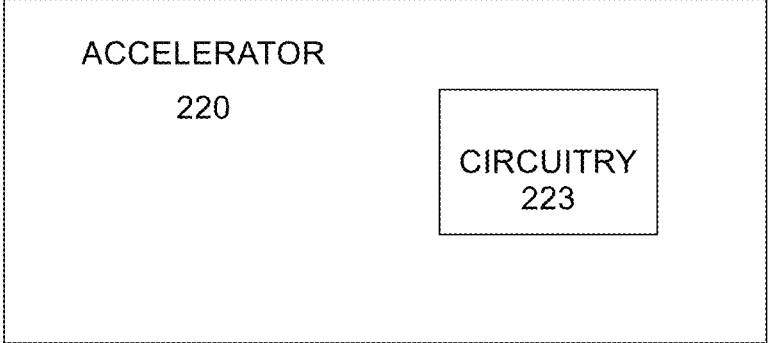
FIG. 2 is a block diagram of an accelerator in one implementation.

With reference to FIG. 2, an example of an accelerator 220 may include circuitry 223 to perform at least one RTCALL operation, and circuitry 223 to cause the accelerator 220 to perform the at least one RTCALL operation. For example, each of the source inputs may include one or more input arguments for a subsequent RTCALL operation. For example, the various inputs and indications may be included in the circuitry itself (e.g., through the opcode, explicit fields of the operation, pre-determined or implicit inputs/indications, etc.), or the operation may explicitly or implicitly point to the information that identifies the various inputs and indications. Similarly, destination locations for the one or more results may be explicit operands of the operation or may be implicit locations (e.g., pre-determined registers or memory locations). For example, in response to the RTCALL operation, circuitry 223 may be further configured to cause accelerator 220 to store the one or more results of the RTCALL operation in a location indicated by the RTCALL operation.

In one example, in response to the RTCALL operation, circuitry 223 may be further configured to cause the accelerator 220 to execute a no operation (NOP) when a runtime call destination equals a predetermined constant value (such as zero or a known invalid memory address); and execute an indirect call with the runtime call destination as a destination address when the runtime call destination does not equal the predetermined constant value (such as zero or a known invalid memory address).

As disclosed herein, the Runtime Call (RTCALL) and Runtime Return (RTRET) is an instruction pair to address CALL/RET overheads specialized to instrumentation usages and other forms of runtime invocations. It is analogous to SYSCALL/SYSRET and SYSENTER/SYSEXIT in some ISAs in that the RTCALL instruction invokes a handler at a fixed address specified in a specialized register. One of the differences that distinguishes RTCALL/RET from instructions defined previously is that the RTCALL instruction does not switch to a different privilege level, even when the instruction is invoked from user mode software. Thus, the runtime call operation is performed at a same privilege level as an OS (in supervisor mode) when the runtime call instruction is invoked from an instrumentation handler in user mode.

Multiple variants of RTCALL/RET are defined herein at different points on the spectrum of efficient support for instrumentation and flexible software support.

In a form that is most analogous to existing CALL, SYSCALL, and SYSENTER instructions, RTCALL uses the stack to store its return address. In fact, this avoids the need for a dedicated RTRET instruction since an ordinary RET instruction can be used to return from the handler. The operation of this variant of RTCALL is illustrated by the pseudocode of Table 4.

TABLE 4

```
----------------------------------------------------------
  © 2022 Intel Corporation
  function exe__rtcall( )= {
    if RTCALL__DEST != 0x0 then {
      exe__call(RTCALL__DEST);
    }
  }
----------------------------------------------------------
```

The prefix "exe_" in the pseudocode sequences herein denotes the execution semantics of an instruction. For example, "exe_rtcall" denotes the execution semantics of an RTCALL instruction, and "exe_call" denotes the execution semantics of a CALL instruction. In particular, "exe_call" in this instance refers to an indirect CALL instruction such as the type with an opcode of FF/2 in the x86 ISA.

The Runtime Call Destination (RTCALL_DEST) register is a specialized predetermined register containing the code address of the handler or zero if the instrumentation should be temporarily disabled. Note that on some architectures, zero can be a valid memory address. Other embodiments could use a predetermined (non-zero) constant value, possibly one that represents a known to be invalid memory address (like a fixed non-canonical address in the x86 ISA). Alternatively, for example, there could be a separate register with a bit that toggles on and off the RTCALL behavior.

This variant of RTCALL provides at least two advantages over an ordinary indirect call. The code address of the handler is specified in a specialized register, RTCALL_DEST, which may be implemented, for example, as an MSR, user mode accessible MSR, Control Register (CR), or a hidden register accessible via XSAVE and XRSTOR instructions. Storing the handler address in a specialized register avoids the need for embedding the relative displacement of the handler from each place in the code where the handler is invoked. As described above, embedding relative displacements bloats the code, and the alternative of using certain code models imposes even more substantial costs.

The instrumentation can be efficiently disabled temporarily by setting the RTCALL_DEST register value to a predetermined constant value, such as zero or a known invalid memory address. For example, this is useful if only certain instances of the code require instrumentation or if the instrumentation should only be enabled intermittently to balance the performance overhead of the instrumentation against the level of security hardening or bug detection provided by the instrumentation.

FIG. 3 is a flow diagram of a method 300 to process a Runtime Call (RTCALL) instruction in one implementation. At block 302, a RTCALL instruction is invoked (for example, by processor 111 and/or circuitry 113 of computing system 100 or circuitry 223 of accelerator 220). At block

304, if the RTCALL destination (RTCALL_DEST) is a predetermined constant value, then the RTCALL is executed at block 306 as a "no operation" (NOP) (e.g., do nothing). If at block 304 the RTCALL destination is not the predetermined constant value, then at block 308 an indirect call is executed with the RTCALL destination as the destination address. Note that in this embodiment, the return address is put on the stack and no special return instruction is needed.

Figure 4:
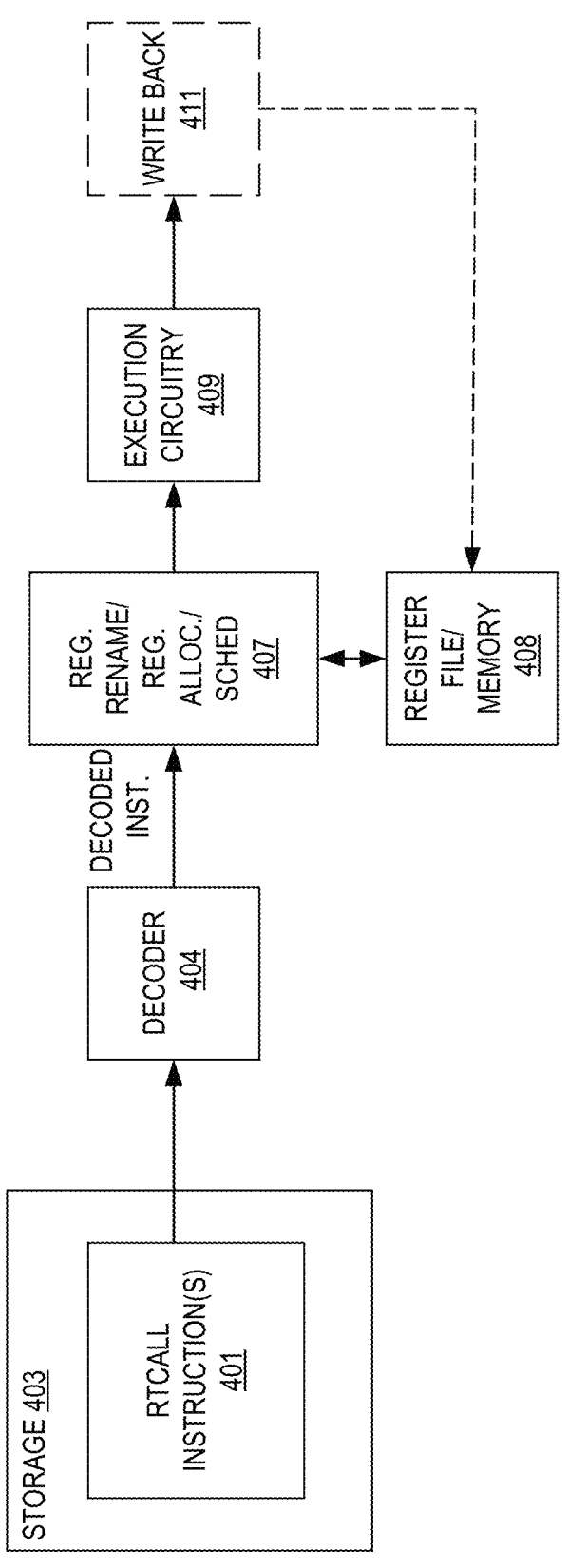
FIG. 4 is a block diagram of computing hardware to process the Runtime Call instruction in one implementation.

FIG. 4 illustrates examples of computing hardware to process a RTCALL instruction. As illustrated, storage 403 stores a RTCALL instruction 401 to be executed.

Figure 15:
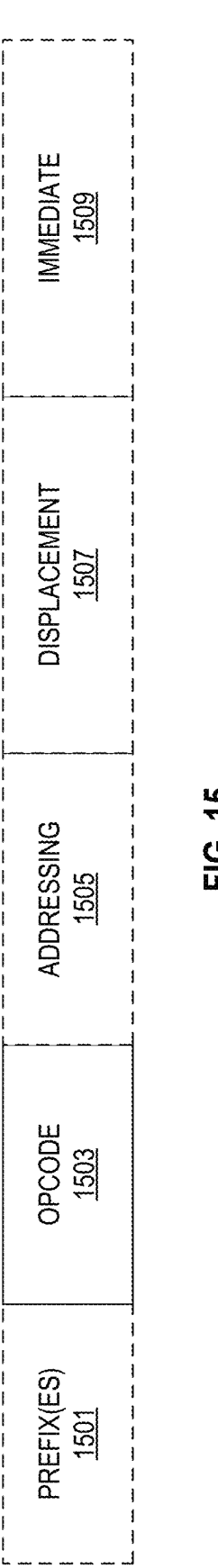
FIG. 15 illustrates examples of an instruction format.

The RTCALL instruction 401 is received by decoder circuitry 404. For example, the decoder circuitry 404 receives this instruction from fetch circuitry (not shown). The instruction may be in any suitable format, such as that describe with reference to FIG. 15 below. In an example, the instruction includes fields for an opcode.

More detailed examples of at least one instruction format for the instruction will be detailed later. The decoder circuitry 404 decodes the instruction into one or more operations. In some examples, this decoding includes generating a plurality of micro-operations to be performed by execution circuitry (such as execution circuitry 409). The decoder circuitry 404 also decodes instruction prefixes.

In some examples, register renaming, register allocation, and/or scheduling circuitry 407 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 408 may store data as operands of the instruction to be operated on by execution circuitry 409. Exemplary register types include packed data registers, general purpose registers (GPRs), MSRs and floating-point registers.

Execution circuitry 409 executes the decoded instruction. Exemplary detailed execution circuitry includes execution cluster(s) 1260 shown in FIG. 12B, etc. The execution of the decoded instruction causes the execution circuitry 409 to perform the RTCALL operation. In some examples, retirement/write back circuitry 411 architecturally retires the instruction.

An example of a format for a RTCALL instruction is OPCODE. In some examples, OPCODE is the opcode mnemonic of the instruction.

FIG. 5 is a flow diagram of a method 500 to process a RTCALL instruction in one implementation. For example, a processor core as shown in FIG. 12B, a pipeline as detailed below, etc., performs this method. At block 501, an instance of a single RTCALL instruction is fetched. The instruction includes a field for an opcode. In some examples, the instruction is fetched from an instruction cache. The opcode indicates the RTCALL operation to be performed.

The fetched instruction is decoded at block 503. For example, the fetched RTCALL instruction is decoded by decoder circuitry such as decoder circuitry 404 or decode circuitry 1240 detailed herein. The decoded RTCALL instruction is scheduled at block 505. At block 507, the decoded RTCALL instruction is executed by execution circuitry (hardware) such as execution circuitry 409 shown in FIG. 4, or execution cluster(s) 1260 shown in FIG. 12B. In some examples, the executed RTCALL instruction is committed or retired at 509.

For the RTCALL instruction, the execution will cause execution circuitry to perform the operations described in connection with FIG. 3. At block 507, the execution circuitry may execute the decoded instruction to execute a no operation when a runtime call destination equals a predetermined constant value (such as zero or a known invalid memory address); and execute an indirect call with the runtime call destination as a destination address when the runtime call destination does not equal the predetermined constant value (such as zero or a known invalid memory address).

FIG. 6 is a flow diagram of another method 600 to process a RTCALL instruction in one implementation using emulation or binary translation. For example, a processor core as shown in FIG. 12B, a pipeline and/or emulation/translation layer perform aspects of this method.

An instance of a single instruction of a first instruction set architecture is fetched at 601. The instance of the single instruction of the first instruction set architecture including fields for an opcode. In some examples, the instruction is fetched from an instruction cache. The opcode indicates at least one RTCALL operation to be performed.

The fetched single instruction of the first instruction set architecture is translated into one or more instructions of a second instruction set architecture at 602. This translation is performed by a translation and/or emulation layer of software in some examples. In some examples, this translation is performed by an instruction converter 2112 as shown in FIG. 21. In some examples, the translation is performed by hardware translation circuitry.

The one or more translated instructions of the second instruction set architecture are decoded at 603. For example, the translated instructions are decoded by decoder circuitry such as decoder circuitry 404 or decode circuitry 1240 detailed herein. In some examples, the operations of translation and decoding at 602 and 603 are merged.

The one or more decoded instructions are scheduled at 605.

At 607, the decoded instruction(s) of the second instruction set architecture is/are executed by execution circuitry (hardware) such as execution circuitry 409 shown in FIG. 4, or execution cluster(s) 1260 shown in FIG. 12B, to perform the operation(s) indicated by the opcode of the single instruction of the first instruction set architecture. In some examples, the instruction is committed or retired at 609.

For the RTCALL instruction, the execution will cause execution circuitry to perform the operations described in connection with FIG. 3. At 607, the execution circuitry may execute the decoded instruction to execute a no operation when a runtime call destination equals a predetermined constant value (such as zero or a known invalid memory address); and execute an indirect call with the runtime call destination as a destination address when the runtime call destination does not equal the predetermined constant value (such as zero or a known invalid memory address).

The variant of RTCALL described in FIG. 3 is insufficient to address other overheads, such as those from stack accesses. The frequency with which the instrumentation handler is invoked in certain instrumentation usages may make it difficult for the processor to efficiently perform all of the memory accesses due to the additional stack accesses required for managing return addresses. Stack overheads are especially pronounced when shadow stack protections (such as Control Flow Enforcement Technology (CET) are enabled.

Additionally, some ABIs (e.g., System V ABI used by Linux™) allow compilers to reserve a red zone beyond the stack pointer. The ABI guarantees that local data kept within the red zone will not be clobbered by the operating system (OS). A red zone is typically used as an optimization to elide moving the stack pointer within leaf functions (i.e., functions that do not call other functions). Hence, an RTCALL instruction within a red-zone-optimized function must not clobber red zone data when the RTCALL instruction pushes the return address to the stack. There are several potential workarounds. Runtimes that use RTCALL instructions could avoid using the red zone optimization. Each RTCALL instruction could be preceded by an instruction to decrement the stack pointer beyond the red zone, and thus each return from an RTCALL must also increment the stack pointer by an equal amount. The RTCALL instruction could have an alternate encoding with an immediate operand that specifies the number of bytes by which to decrement the stack pointer before pushing the return address to the stack (e.g., x86 already has an alternate encoding of RET with an immediate operand that specifies the number of bytes by which to increment the stack pointer after popping the return address from the stack).

A second variant of RTCALL described herein is designed to avoid stack overheads and ABI complexity (such as the red zone issue) by storing the return address for each RTCALL instruction in turn in a second register (e.g., MSR, user mode accessible MSR, CR, or hidden register). This new register is called the Runtime Return (RTRET) destination (RTRET_DEST). An example of pseudocode for this variant of RTCALL along with the corresponding RTRET instruction is shown in Table 5.

TABLE 5

```
---------------------------------------------------------------
© 2022 Intel Corporation
function exe_rtcall( )= {
    if RTCALL_DEST != 0x0 then {
        // Record return location to be used later in RTRET.
        // Assume RIP points to next instruction after RTCALL:
        RTRET_DEST = RIP;
        // Branch to instrumentation handler:
        RIP = RTCALL_DEST;
    }
}
function exe_rtret( )= {
    if RTRET_DEST == 0x0 then {
        // The instrumentation control flow should be precisely matched.
        // Throw a #GP(0) (generate exception) if a mismatch arises due to a program error.
        throw GP(0);
    };
    RIP = RTRET_DEST;
        RTRET_DEST = 0x0;
}
---------------------------------------------------------------
```

Figure 7:
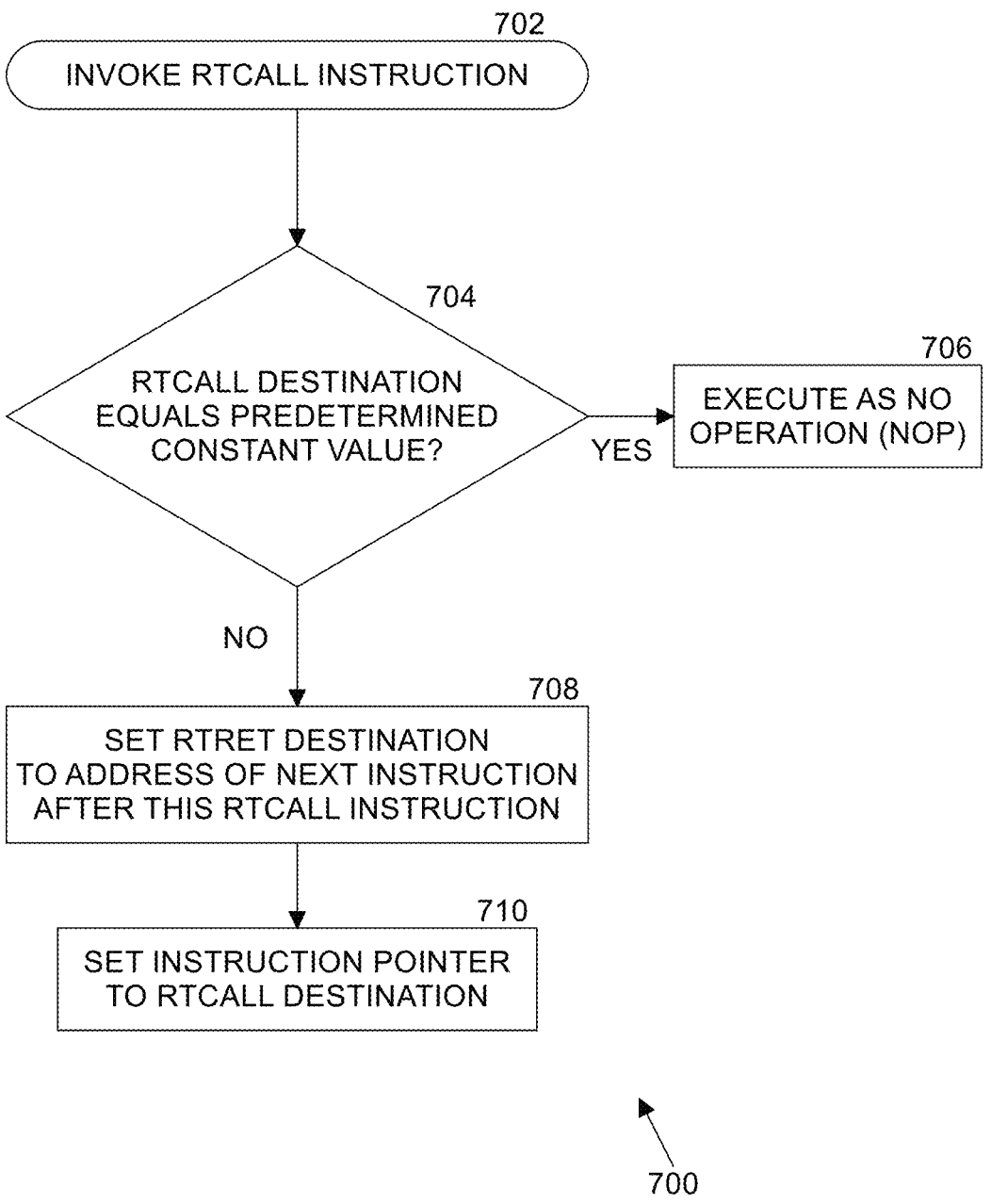
FIG. 7 is a flow diagram of a method to process the Runtime Call instruction in another implementation.

FIG. 7 is a flow diagram of a method 700 to process the Runtime Call instruction in another implementation. At block 702, a RTCALL instruction is invoked (for example, by processor 111 and/or circuitry 113 of computing system 100 or circuitry 223 of accelerator 220). At block 704, if the RTCALL destination (RTCALL_DEST) is a predetermined constant value (such as zero or a known invalid memory address), then the RTCALL is executed at block 706 as a "no operation" (NOP). If at block 704 the RTCALL destination is not the predetermined constant value (such as zero or a known invalid memory address), then at block 708 the RTRET destination is set to the address of the next instruction after this RTCALL instruction. At block 710, the instruction pointer is set to the RTCALL destination.

The variant of the RTCALL instruction shown in FIG. 7 may be implemented in a manner similar to that described in FIGS. 4-6 for the variant of the RTCALL instruction shown in FIG. 3.

Figure 8:
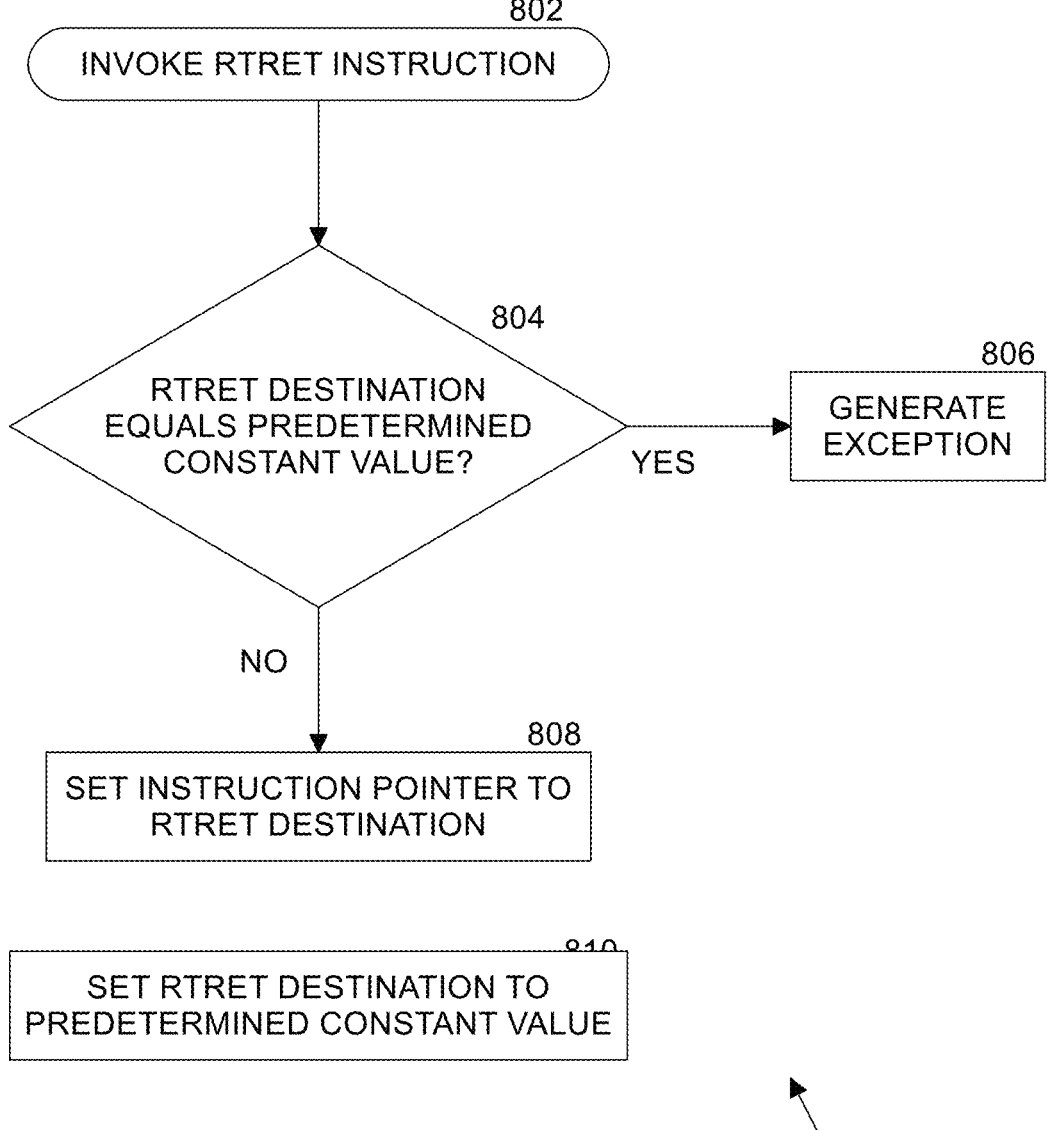
FIG. 8 is a flow diagram of a method to process a Runtime Return instruction in one implementation.

FIG. 8 is a flow diagram of a method 800 to process a Runtime Return (RTRET) instruction in one implementation. The RTRET instruction should match to a corresponding RTCALL instruction. At block 802, a RTCALL instruction is invoked (for example, by processor 111 and/or circuitry 113 of computing system 100 or circuitry 223 of accelerator 220). At block 804, if the RTRET destination (RTRET_DEST) (which should have been previously set at block 708 of FIG. 7) is a predetermined constant value (such as zero or a known invalid memory address), then an exception is generated at block 806. This indicates an error due to a mismatched or missing RTCALL/RERET instruction pair. If at block 804 the RTRET destination is not the predetermined constant value (such as zero or a known invalid memory address), then at block 808 the instruction pointer is set to the RTRET destination (RTRET_DEST). At block 808, the RTRET destination is set to the predetermined constant value.

The RTRET instruction shown in FIG. 8 may be implemented in a manner similar to that described in FIGS. 4-6 for the variant of the RTCALL instruction shown in FIG. 3.

Note that it is unnecessary to check for an ENDBRANCH instruction at the destination of the RTRET, even though the RTRET instruction is a new type of indirect branch that is not checked against the shadow stack. This is because the value of RTRET_DEST that determines the destination of RTRET cannot be corrupted using the methods typically relied upon by adversaries to hijack control flow, such as overwriting a return address on the stack or a function pointer.

The tradeoff inherent in the variant of RTCALL shown in FIG. 7 is that this RTCALL is not reentrant. If a second RTCALL is executed prior to an RTRET being executed, the second RTCALL will overwrite the value of RTCALL_DEST set by the first instance of RTCALL. In some embodiments, RTCALL may generate an exception (e.g., set #GP (0) in some implementations), if RTRET_DEST is non-zero to detect buggy, overlapping invocations of an RTCALL handler.

If software needs to execute RTCALL in a reentrant manner, the software can save and restore the value of RTRET_DEST surrounding the reentrant use of RTCALL and RTRET. For example, if RTRET_DEST is contained in a hidden register, then a pair of XSAVE and XRSTOR instructions may be used to save and restore the original value of RTRET_DEST.

Separate sets of RTCALL_DEST/RTRET_DEST registers may be maintained for user versus supervisor mode or even for individual privilege levels in the range 0-3. The values of relevant RTCALL_DEST/RTRET_DEST registers should be saved and restored across context switches, e.g., when switching processes, compartments, or virtualization modes. For example, when switching processes or compartments, the RTCALL_DEST/RTRET_DEST registers for privilege level 3 (user privilege level) should be saved and restored. On the other hand, when switching virtualization modes, e.g., to exit from the guest into the host and vice-versa, RTCALL_DEST/RTRET_DEST registers for all privilege levels should be saved and restored. For example, Virtual Machine Control Structure (VMCS) fields could be defined to automatically save and restore RTCALL_DEST/RTRET_DEST register contents for each virtualization mode (root/host and non-root/guest).

The RTCALL may be enabled continuously or may be enabled intermittently. For example, by enabling RTCALL according to a duty cycle, such as for 1,000,000 cycles every 1,000,000,000 cycles, this can balance the overheads of instrumentation with the level of coverage that is provided. The duty cycle may be implemented by software alternating when RTCALL_DEST is set to the predetermined constant value versus not the predetermined constant value. If the duty cycle update routine happens to preempt a running handler, the duty cycle update routine can also clear RTRET_DEST while clearing RTCALL_DEST. Alternatively, hardware (e.g., processor 111 or accelerator 220) may implement a configurable duty cycle, e.g., with a new MSR specifying the duty cycle.

To allow more efficient and flexible support for controlling the duty cycle from software, EFLAGS/RFLAGS may be extended with a new flag that can be modified using, in one implementation, the POPF instruction (including from user mode) or a dedicated, unprivileged instruction. RTCALL may check the value of the flag to disable RTCALL execution even if RTCALL_DEST is not the predetermined constant value (e.g., non-zero or not the known invalid memory address).

Alternatively, a separate determination can be made for each instance of RTCALL as to whether the handler should be invoked. For example, the feature could be configured such that 10% of the RTCALL instructions are executed and the rest are skipped. The desired ratio could be configured using a new specialized register.

Figure 9:
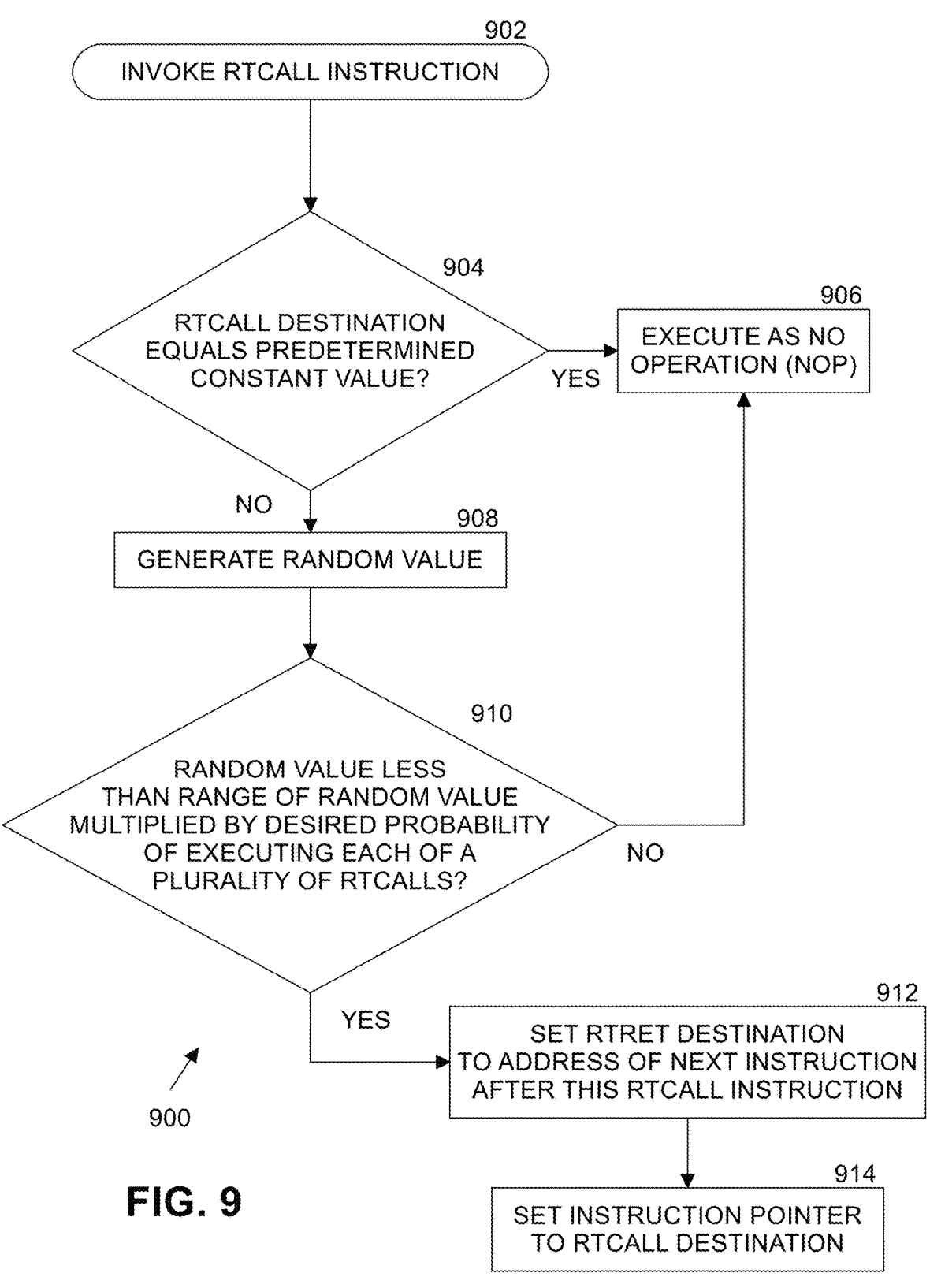
FIG. 9 is a flow diagram of a method to process a Runtime Call instruction in yet another implementation.

FIG. 9 is a flow diagram of a method 900 to process a Runtime Call instruction in yet another implementation. In this implementation, a random value is generated and used to determine, at least in part, when to perform the RTCALL/RTRET instruction pair. At block 902, a RTCALL instruction is invoked (for example, by processor 111 and/or circuitry 113 of computing system 100 or circuitry 223 of accelerator 220). At block 904, if the RTCALL destination (RTCALL_DEST) is a predetermined constant value (such as zero or a known invalid memory address), then the RTCALL is executed at block 906 as a "no operation" (NOP). If at block 904 the RTCALL destination is not the predetermined constant value (such as zero or a known invalid memory address), then at block 908 a random value is generated. At block 910, if the random value is less than a range of the random value multiplied by a desired probability of executing each of a plurality of RTCALL instructions, then at block 912 the RTRET destination is set to the address of the next instruction after this RTCALL instruction and at block 914, the instruction pointer is set to the RTCALL destination. Otherwise, processing after block 910 continues with block 906 where the RTCALL is executed as a "no operation" (NOP).

The variant of the RTCALL instruction shown in FIG. 9 may be implemented in a manner similar to that described in FIGS. 4-6 for the variant of the RTCALL instruction shown in FIG. 3.

Instead of using a random value, it may also be adequate to increment a counter until the counter reaches a specified value, execute the RTCALL at that time, and then reset the counter. However, that may introduce additional state to maintain, e.g., across context switches, whereas a random number generator may minimize additional state that needs to be context-switched. For example, just the desired probability of executing each of a plurality of RTCALL instructions may need to be saved and restored on context switches. If there is a risk of random numbers generated in one context revealing patterns of random numbers in other contexts, e.g., if a pseudo random number generator is shared across contexts, then the generator may be re-seeded at each context switch or the seed may be saved and restored at each context switch.

Multiple varieties of instrumentation or other runtime-provided routines may exist within the same program. They may be multiplexed through a common RTCALL handler entry point. For example, a designated general-purpose register may be populated with a value identifying the desired routine. RTCALL itself may even accept an immediate operand that the RTCALL will then use to initialize a particular register (e.g., RAX) that can then be checked at the handler entry point.

Alternatively, RTCALL may select different entry point code addresses depending on the handler type that is requested. For example, multiple RTCALL_DEST registers may be defined, and a different type of handler could be located at each of them. For example, in addition to a tag check handler, handlers may be defined for the following types of instrumentation and other usages: Microsoft Control Flow Guard (CFG), low level virtual machine (LLVM) Control Flow Integrity (CFI) enforcement, stack cookie enforcement, software trace instrumentation, race detection, fuzzing, fine-grained indirect branch tracking (FineIBT) (including being able to efficiently disable instrumentation when entering an incompatible section of code), compartment entry point control, selective serialization for transient execution hardening (e.g., based on whether kernel code is invoked from a kernel thread versus a user thread), invocation of built-ins, e.g., within JavaScript engines, and dynamic analysis (a dynamic binary instrumentation tool, a runtime code manipulation tool, etc.).

The various types of handlers may be selected using an immediate operand to RTCALL or by passing a handler index in a general-purpose register (GPR) (however, this may increase code bloat). That is, the value of the immediate operand or GPR operand is to indicate which RTCALL_DEST register to use for determining the runtime destination address, and the processor executes instructions of a corresponding instrumentation handler starting at the runtime destination address. An alternative for determining the runtime destination address based on just a single RTCALL_DEST register is to multiply the specified handler index by a scale factor that may be fixed or configurable, e.g., in an MSR, and add that to the value of the RTCALL_DEST register to compute the handler code entry point address.

Instead, it may be more efficient to define distinct RTCALL instructions for each type of handler, each of which would have a corresponding register (or set of registers) governing the behavior of the distinct RTCALL instruction. It may be beneficial to define those instructions in the legacy NOP space so that the same binary can be run both on legacy computing systems without breaking functionality as well as on new computing systems that can execute the instrumentation.

For example, two-byte direct jump instructions with a relative displacement of zero do not result in any change to architectural state that would affect the operation of a typical program. For example, such instructions may lead to additional trace packets being generated by Processor Trace (PT), but typical programs do not inspect processor traces. Even those auxiliary services that may analyze processor traces are unlikely to have their operation disrupted by additional packets of that sort. Other types of architectural state changes may occur due to the insertion of such instructions, but they are similarly unlikely to disrupt the correct functioning of the system.

There are several variants of direct jump instructions predicated on various conditions, so each of those variants (all with the relative displacement set to zero) may be used to invoke a different type of handler on machines that support RTCALL and have RTCALL enabled.

All types of handlers may have their return addresses stored in a shared RTRET_DEST register (or the stack, for such embodiments) if only a single type of handler needs to be invoked at a time, i.e., such that every RTCALL is paired with an RTRET with no other intervening RTCALL instruction. Even if there is a requirement for such intervening RTCALL instructions, the software approach described above of saving and restoring the contents of RTRET_DEST can still allow such interleaving even when multiple types of handlers are supported.

Alternatively, a separate RTRET_DEST register may be defined for each type of handler. Relatively few RTRET instructions are required, e.g., perhaps just one for each type of handler. Thus, using a relatively large encoding for RTRET is unlikely to significantly bloat code or impair performance. Specifying an immediate operand to indicate the type of handler containing the RTRET instruction such that the appropriate RTRET_DEST register can be used is likely adequate.

Some instrumentation approaches only need to invoke a software handler for certain operations. For example, some techniques rely on encrypting large objects using different keys to isolate those objects(probabilistically) and rely on instrumentation to check a tag table for small objects that would suffer from excessive padding overhead to be isolated cryptographically at a cache line granularity. The distinction between small and large objects can be encoded in pointers.

The check for whether tags need to be loaded from the tag table would be straightforward in a hardware memory tagging implementation, but it could introduce substantial additional overhead in a software tagging approach. Thus, a new RTCallIfTagged instruction may be useful for calling an instrumentation handler if and only if the following conditions are satisfied: 1) The instrumentation is enabled, e.g., via an MSR setting (his control supports disabling instrumentation with minimal residual overhead); and 2) The large object tag pointer field matches the reserved small object value.

One drawback of FineIBT is that the use of FineIBT inflates code with instruction sequences for checking function types at the beginning of each function and handling mismatches. RTCALL would enable refactoring out some of those instructions so that they are not repeated in every function. Only the per-function unique instructions would be retained in each function. For example, an instruction that encodes the expected function type ID and compares the expected function ID to the one supplied by the caller in a register could precede the RTCALL instruction, and then the shared RTCALL routine could respond appropriately depending on the value of the RFLAGS register as determined by the preceding type ID comparison.

An alternative to performing the type ID comparison prior to the RTCALL would be to inject the expected type ID into the same register as the caller-supplied type ID or a separate register and perform the comparison inside of the RTCALL handler. It could even be possible to encode the expected type ID into the RTCALL instruction itself and define RTCALL to inject that into a register for the handler to use.

Another way that RTCALL could optimize FineIBT is by disabling the checks within programs that are not entirely compatible with FineIBT. Today, the runtime library sets a flag in memory to indicate that the program is incompatible, and the function type checking instruction sequences each check that flag first prior to signaling any function type mismatches. Checking that flag introduces overhead. Using RTCALL to invoke that instrumentation would avoid that runtime overhead to check the flag. Instead, the runtime library would disable the type of RTCALL used for FineIBT checks at the time that the runtime library determines the program is incompatible. Subsequently, all the RTCALL instructions of that type would be skipped with no redundant flag checking. There may be some instructions outside of the RTCALL handler that would also need to be disabled in this case, e.g., an instruction with the expected function type ID encoded into the instruction that compares the expected function type ID with the one supplied at the call site. Such instructions could be preceded by a prefix or assigned a new encoding to cause the instruction to be skipped, i.e., executed as a no-op, whenever the FineIBT type of RTCALL instruction is disabled.

To help with supporting both unchecked direct calls and checked indirect calls for particular functions, RTCALL could be defined to only execute if an indirect call lands on the RTCALL. This would be especially useful for a variant of RTCALL that injects the expected type ID in a register itself to avoid depending on some other instruction(s) preceding the RTCALL, which could then prevent RTCALL itself from determining whether the RTCALL was reached via a direct or an indirect call. Another variant of RTCALL that would address this challenge would be one that, if reached via an indirect branch, first executes instructions preceding RTCALL, for example the 16 bytes worth of preceding instructions, prior to invoking the RTCALL handler. Function-specific instructions could be placed in that region ahead of the RTCALL handler.

CET Indirect Branch Tracking (IBT) could be revised to generate an exception if an indirect branch does not land on either an ENDBRANCH instruction or RTCALL. For example, ENDBRANCH could be used for call targets not requiring instrumentation, and RTCALL could be used for call targets that do require instrumentation.

To support reentrancy, OS signal delivery should save and restore the RTRET_DEST register so that instrumentation can be applied to signal handlers. If an RTCALL handler itself needs to be instrumented, the RTCALL handler should also save and restore RTRET_DEST around invoking a software interrupt.

RTCALL can be used to restrict access to memory regions based on the identity of the active code, e.g., to restrict write access to Just-In-Time (JIT)-compiled code pages such that only authorized JIT compiler code (e.g., as determined by the JIT compiler being implemented in a particular set of source code files) is allowed to write those JIT code pages. For example, each store that is not authorized to update JIT code pages (e.g., because it is not within the JIT compiler code) could be preceded by an RTCALL to a check routine that determines whether the access is to any JIT code page. For example, the check routine may contain an embedded start and end address for the JIT code region as immediate operands, or it may load such start and end addresses from variables in memory, or it may consult a bitmap with a bit for each page indicating whether it contains JIT code, or it may look up the page address in a hash set of JIT code pages, or it may consult some other type of data structure. If the attempted access is to a prohibited memory region, a response could be performed, such as terminating the program. Each RTCALL could be preceded by code to compute the extent of the memory access and pass that to the RTCALL check routine so that the check routine could determine whether the access is to any code page. Other examples of memory regions that could be protected in this way include stacks and sensitive global variables and the data structures that the RTCALL handler itself uses to identify restricted memory regions. In addition to coarse-grained code identity information such as distinguishing a JIT compiler from other code in a process, the code identity may also be distinguished at a fine granularity. For example, particular instructions within a function may be authorized to access the stack, and other instructions within the same function may be prohibited from doing so. The latter instructions could be instrumented using RTCALL to prevent them from accessing the stack. The RTCALL check routine may consult additional configuration information when determining whether a memory access should be permitted. For example, a mapping from page addresses to permission indices may be maintained by software, and a global variable in memory may indicate for each permission index what types of accesses (e.g., read, write, or execute) should currently be permitted for the pages with that permission index. That global variable specifying access rights may itself be protected using RTCALL and updateable exclusively via an authorized RTCALL handler.

Exemplary Computer Architectures.

Detailed below are describes of exemplary computer architectures in which the technology described above may be implemented. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 10:
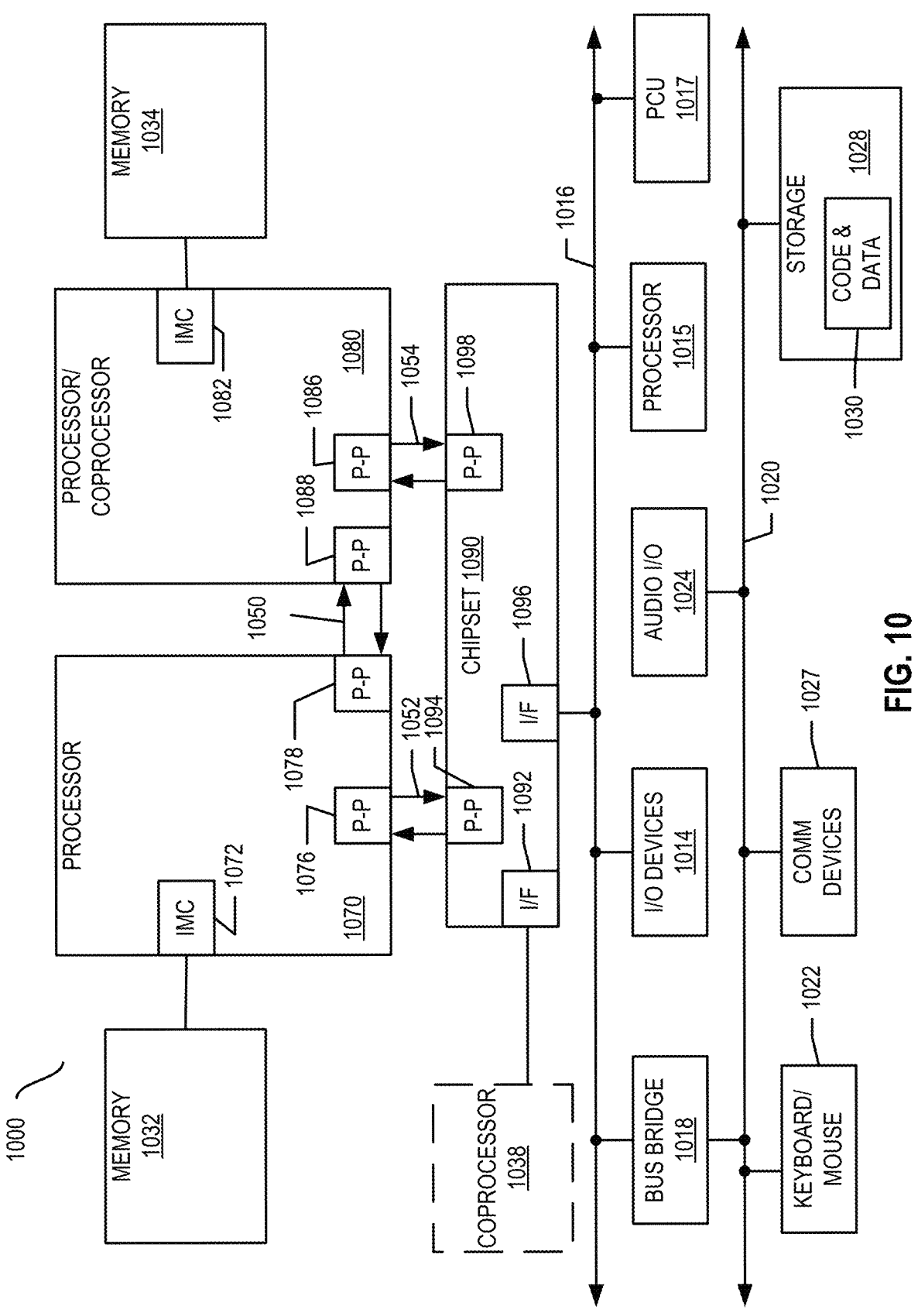
FIG. 10 illustrates an exemplary computing system.

FIG. 10 illustrates an exemplary system. Multiprocessor system 1000 is a point-to-point interconnect system and includes a plurality of processors including a first processor 1070 and a second processor 1080 coupled via a point-to-point interconnect 1050. In some examples, the first processor 1070 and the second processor 1080 are homogeneous. In some examples, first processor 1070 and the second processor 1080 are heterogenous. Though the exemplary multiprocessor system 1000 is shown to have two processors, the system may have three or more processors, or may be a single processor system.

Processors 1070 and 1080 are shown including integrated memory controller (IMC) circuitry 1072 and 1082, respectively. Processor 1070 also includes as part of its interconnect controller point-to-point (P-P) interfaces 1076 and 1078; similarly, second processor 1080 includes P-P interfaces 1086 and 1088. Processors 1070, 1080 may exchange information via the point-to-point (P-P) interconnect 1050 using P-P interface circuits 1078, 1088. IMCs 1072 and 1082 couple the processors 1070, 1080 to respective memories, namely a memory 1032 and a memory 1034, which may be portions of main memory locally attached to the respective processors.

Processors 1070, 1080 may each exchange information with a chipset 1090 via individual P-P interconnects 1052, 1054 using point to point interface circuits 1076, 1094, 1086, 9108. Chipset 1090 may optionally exchange information with a coprocessor 1038 via an interface 1092. In some examples, the coprocessor 1038 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1070, 1080 or outside of both processors, yet connected with the processors via P-P interconnect, such that either or both processors' local cache information may be stored in the shared cache if a processor is placed into a low power mode.

Chipset 1090 may be coupled to a first interconnect 1016 via an interface 1096. In some examples, first interconnect 1016 may be a Peripheral Component Interconnect (PCI) interconnect, or an interconnect such as a PCI Express interconnect or another I/O interconnect. In some examples, one of the interconnects couples to a power control unit (PCU) 1017, which may include circuitry, software, and/or firmware to perform power management operations with regard to the processors 1070, 1080 and/or coprocessor 1038. PCU 1017 provides control information to a voltage regulator (not shown) to cause the voltage regulator to generate the appropriate regulated voltage. PCU 1017 also provides control information to control the operating voltage generated. In various examples, PCU 1017 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1017 is illustrated as being present as logic separate from the processor 1070 and/or processor 1080. In other cases, PCU 1017 may execute on a given one or more of cores (not shown) of processor 1070 or 1080. In some cases, PCU 1017 may be implemented as a microcontroller (dedicated or general-purpose) or other control logic configured to execute its own dedicated power management code, sometimes referred to as P-code. In yet other examples, power management operations to be performed by PCU 1017 may be implemented externally to a processor, such as by way of a separate power management integrated circuit (PMIC) or another component external to the processor. In yet other examples, power management operations to be performed by PCU 1017 may be implemented within BIOS or other system software.

Various I/O devices 1014 may be coupled to first interconnect 1016, along with a bus bridge 1018 which couples first interconnect 1016 to a second interconnect 1020. In some examples, one or more additional processor(s) 1015, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interconnect 1016. In some examples, second interconnect 1020 may be a low pin count (LPC) interconnect. Various devices may be coupled to second interconnect 1020 including, for example, a keyboard and/or mouse 1022, communication devices 1027 and a storage circuitry 1028. Storage circuitry 1028 may be one or more non-transitory machine-readable storage media as described below, such as a disk drive or other mass storage device which may include instructions/code and data 1030. Further, an audio I/O 1024 may be coupled to second interconnect 1020. Note that other architectures than the point-to-point architecture described above are possible. For example, instead of the point-to-point architecture, a system such as multiprocessor system 1000 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above-described coprocessor, and additional functionality. Exemplary core architectures are described next, followed by descriptions of exemplary processors and computer architectures.

Figure 11:
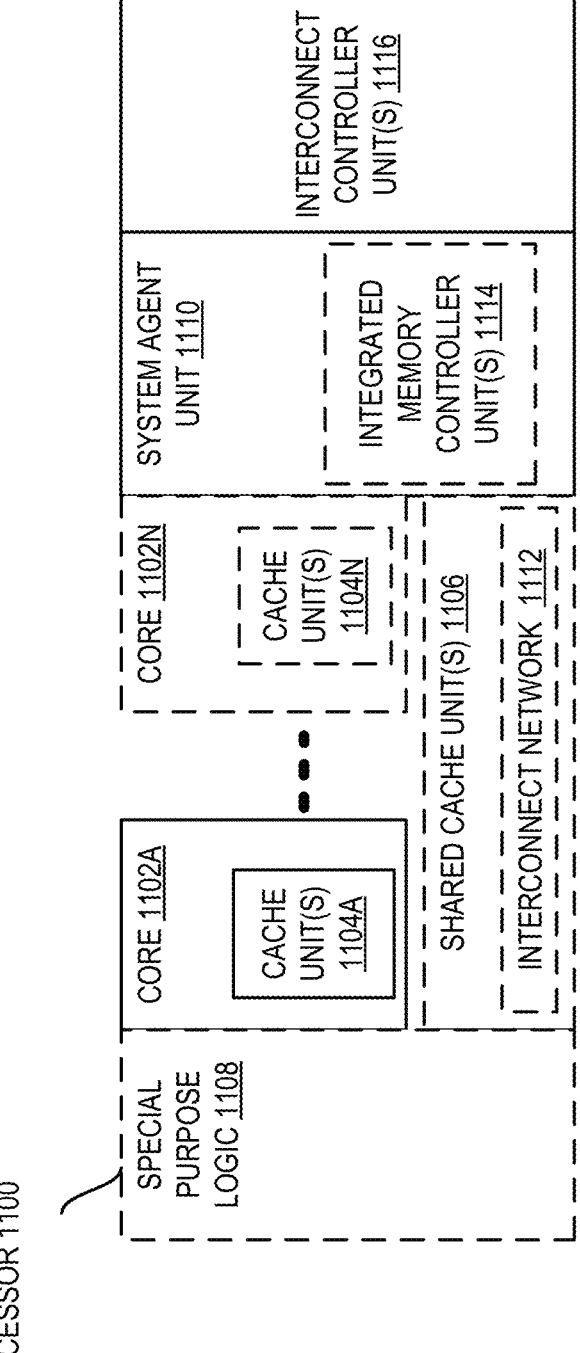
FIG. 11 illustrates a block diagram of an example processor that may have more than one core and an integrated memory controller.

FIG. 11 illustrates a block diagram of an example processor 1100 that may have more than one core and an integrated memory controller. The solid lined boxes illustrate a processor 1100 with a single core 1102A, a system agent unit circuitry 1110, a set of one or more interconnect controller unit(s) circuitry 1116, while the optional addition of the dashed lined boxes illustrates an alternative processor 1100 with multiple cores 1102(A)-(N), a set of one or more integrated memory controller unit(s) circuitry 1114 in the system agent unit circuitry 1110, and special purpose logic 1108, as well as a set of one or more interconnect controller units circuitry 1116. Note that the processor 1100 may be one of the processors 1070 or 1080, or coprocessor 1038 or 1015 of FIG. 10.

Thus, different implementations of the processor 1100 may include: 1) a CPU with the special purpose logic 1108 being integrated graphics and/or scientific (throughput) logic (which may include one or more cores, not shown), and the cores 1102(A)-(N) being one or more general purpose cores (e.g., general purpose in-order cores, general purpose out-of-order cores, or a combination of the two); 2) a coprocessor with the cores 1102(A)-(N) being a large number of special purpose cores intended primarily for graphics and/or scientific (throughput); and 3) a coprocessor with the cores 1102(A)-(N) being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1104(A)-(N) within the cores 1102(A)-(N), a set of one or more shared cache unit(s) circuitry 1106, and external memory (not shown) coupled to the set of integrated memory controller unit(s) circuitry 1114. The set of one or more shared cache unit(s) circuitry 1106 may include one or more mid-level caches, such as level 2 (L2), level 3 (L3), level 4 (L4), or other levels of cache, such as a last level cache (LLC), and/or combinations thereof. While in some examples ring-based interconnect network circuitry 1112 interconnects the special purpose logic 1108 (e.g., integrated graphics logic), the set of shared cache unit(s) circuitry 1106, and the system agent unit circuitry 1110, alternative examples use any number of well-known techniques for interconnecting such units. In some examples, coherency is maintained between one or more of the shared cache unit(s) circuitry 1106 and cores 1102(A)-(N).

In some examples, one or more of the cores 1102(A)-(N) are capable of multi-threading. The system agent unit circuitry 1110 includes those components coordinating and operating cores 1102(A)-(N). The system agent unit circuitry 1110 may include, for example, power control unit (PCU) circuitry and/or display unit circuitry (not shown). The PCU may be or may include logic and components needed for regulating the power state of the cores 1102(A)-(N) and/or the special purpose logic 1108 (e.g., integrated graphics logic). The display unit circuitry is for driving one or more externally connected displays.

The cores 1102(A)-(N) may be homogenous in terms of instruction set architecture (ISA). Alternatively, the cores 1102(A)-(N) may be heterogeneous in terms of ISA; that is, a subset of the cores 1102(A)-(N) may be capable of executing an ISA, while other cores may be capable of executing only a subset of that ISA or another ISA.

Exemplary Core Architectures—In-Order and Out-of-Order Core Block Diagram.

Figure 12A:
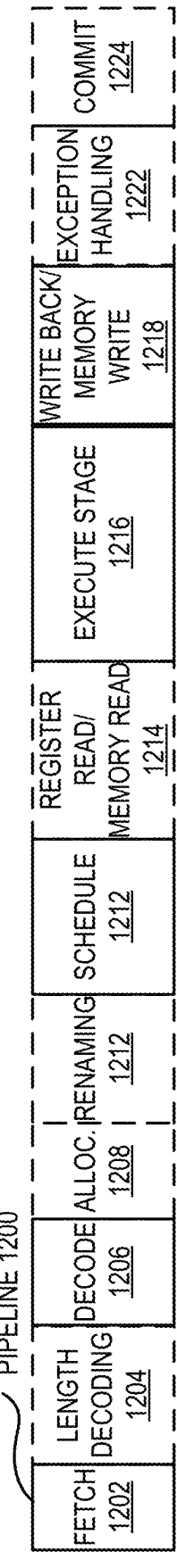
FIG. 12A is a block diagram illustrating both an exemplary in-order pipeline and an exemplary register renaming, out-of-order issue/execution pipeline according to examples.
Figure 12B:
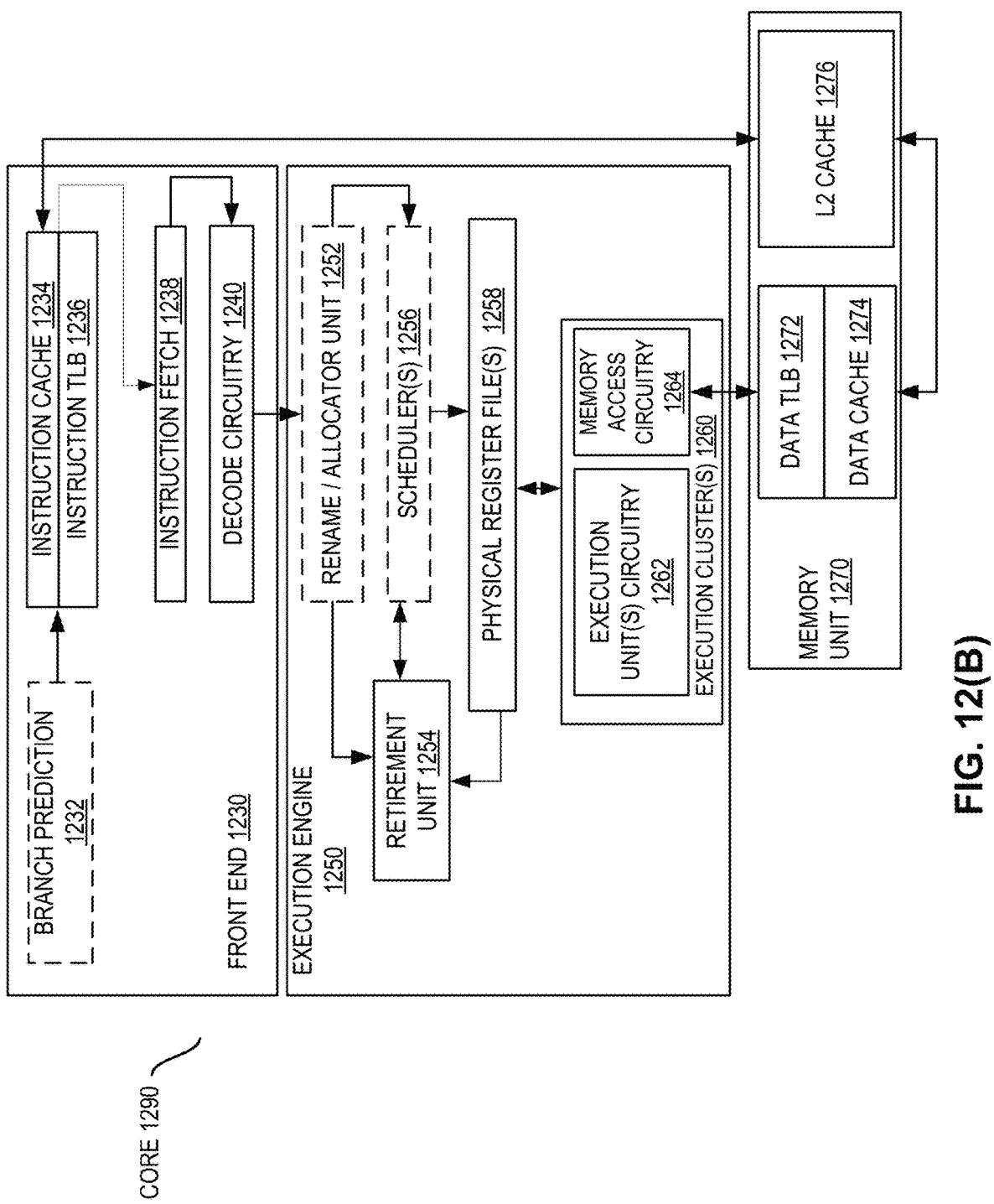
FIG. 12B is a block diagram illustrating both an exemplary example of an in-order architecture core and an exemplary register renaming, out-of-order issue/execution architecture core to be included in a processor according to examples.

FIG. 12A is a block diagram illustrating both an exemplary in-order pipeline and an exemplary register renaming, out-of-order issue/execution pipeline according to examples. FIG. 12B is a block diagram illustrating both an exemplary example of an in-order architecture core and an exemplary register renaming, out-of-order issue/execution architecture core to be included in a processor according to examples. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, an optional length decoding stage 1204, a decode stage 1206, an optional allocation (Alloc) stage 1208, an optional renaming stage 1210, a schedule (also known as a dispatch or issue) stage 1212, an optional register read/memory read stage 1214, an execute stage 1216, a write back/memory write stage 1218, an optional exception handling stage 1222, and an optional commit stage 1224. One or more operations can be performed in each of these processor pipeline stages. For example, during the fetch stage 1202, one or more instructions are fetched from instruction memory, and during the decode stage 1206, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1206 and the register read/memory read stage 1214 may be combined into one pipeline stage. In one example, during the execute stage 1216, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 12B may implement the pipeline 1200 as follows: 1) the instruction fetch circuitry 1238 performs the fetch and length decoding stages 1202 and 1204; 2) the decode circuitry 1240 performs the decode stage 1206; 3) the rename/allocator unit circuitry 1252 performs the allocation stage 1208 and renaming stage 1210; 4) the scheduler(s) circuitry 1256 performs the schedule stage 1212; 5) the physical register file(s) circuitry 1258 and the memory unit circuitry 1270 perform the register read/memory read stage 1214; the execution cluster(s) 1260 perform the execute stage 1216; 6) the memory unit circuitry 1270 and the physical register file(s) circuitry 1258 perform the write back/memory write stage 1218; 7) various circuitry may be involved in the exception handling stage 1222; and 8) the retirement unit circuitry 1254 and the physical register file(s) circuitry 1258 perform the commit stage 1224.

FIG. 12B shows a processor core 1290 including front-end unit circuitry 1230 coupled to an execution engine unit circuitry 1250, and both are coupled to a memory unit circuitry 1270. The core 1290 may be a reduced instruction set architecture computing (RISC) core, a complex instruction set architecture computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit circuitry 1230 may include branch prediction circuitry 1232 coupled to an instruction cache circuitry 1234, which is coupled to an instruction translation lookaside buffer (TLB) 1236, which is coupled to instruction fetch circuitry 1238, which is coupled to decode circuitry 1240. In one example, the instruction cache circuitry 1234 is included in the memory unit circuitry 1270 rather than the front-end circuitry 1230. The decode circuitry 1240 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1240 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1240 may be implemented using various different mechanisms. Examples of suitable mechanisms include, but are not limited to, look-up tables, hardware implementations, programmable logic arrays (PLAs), microcode read only memories (ROMs), etc. In one example, the core 1290 includes a microcode ROM (not shown) or other medium that stores microcode for certain macroinstructions (e.g., in decode circuitry 1240 or otherwise within the front end circuitry 1230). In one example, the decode circuitry 1240 includes a micro-operation (micro-op) or operation cache (not shown) to hold/cache decoded operations, micro-tags, or micro-operations generated during the decode or other stages of the processor pipeline 1200. The decode circuitry 1240 may be coupled to rename/allocator unit circuitry 1252 in the execution engine circuitry 1250.

The execution engine circuitry 1250 includes the rename/allocator unit circuitry 1252 coupled to a retirement unit circuitry 1254 and a set of one or more scheduler(s) circuitry 1256. The scheduler(s) circuitry 1256 represents any number of different schedulers, including reservations stations, central instruction window, etc. In some examples, the scheduler(s) circuitry 1256 can include arithmetic logic unit (ALU) scheduler/scheduling circuitry, ALU queues, arithmetic generation unit (AGU) scheduler/scheduling circuitry, AGU queues, etc. The scheduler(s) circuitry 1256 is coupled to the physical register file(s) circuitry 1258. Each of the physical register file(s) circuitry 1258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1258 includes vector registers unit circuitry, write-mask registers unit circuitry, and scalar register unit circuitry. These register units may provide architectural vector registers, vector mask registers, general-purpose registers, etc. The physical register file(s) circuitry 1258 is coupled to the retirement unit circuitry 1254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1254 and the physical register file(s) circuitry 1258 are coupled to the execution cluster(s) 1260. The execution cluster(s) 1260 includes a set of one or more execution unit(s) circuitry 1262 and a set of one or more memory access circuitry 1264. The execution unit(s) circuitry 1262 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1256, physical register file(s) circuitry 1258, and execution cluster(s) 1260 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1264). It should also be understood that where separate pipelines are used, one or more of these pipelines may be out-of-order issue/execution and the rest in-order.

In some examples, the execution engine unit circuitry 1250 may perform load store unit (LSU) address/data pipelining to an Advanced Microcontroller Bus (AMB) interface (not shown), and address phase and writeback, data phase load, store, and branches.

The set of memory access circuitry 1264 is coupled to the memory unit circuitry 1270, which includes data TLB circuitry 1272 coupled to a data cache circuitry 1274 coupled to a level 2 (L2) cache circuitry 1276. In one exemplary example, the memory access circuitry 1264 may include a load unit circuitry, a store address unit circuit, and a store data unit circuitry, each of which is coupled to the data TLB circuitry 1272 in the memory unit circuitry 1270. The instruction cache circuitry 1234 is further coupled to the level 2 (L2) cache circuitry 1276 in the memory unit circuitry 1270. In one example, the instruction cache 1234 and the data cache 1274 are combined into a single instruction and data cache (not shown) in L2 cache circuitry 1276, a level 3 (L3) cache circuitry (not shown), and/or main memory. The L2 cache circuitry 1276 is coupled to one or more other levels of cache and eventually to a main memory.

The core 1290 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1290 includes logic to support a packed data instruction set architecture extension (e.g., AVX1, AVX2), thereby allowing the operations used by many multimedia applications to be performed using packed data.

Exemplary Execution Unit(s) Circuitry.

Figure 13:
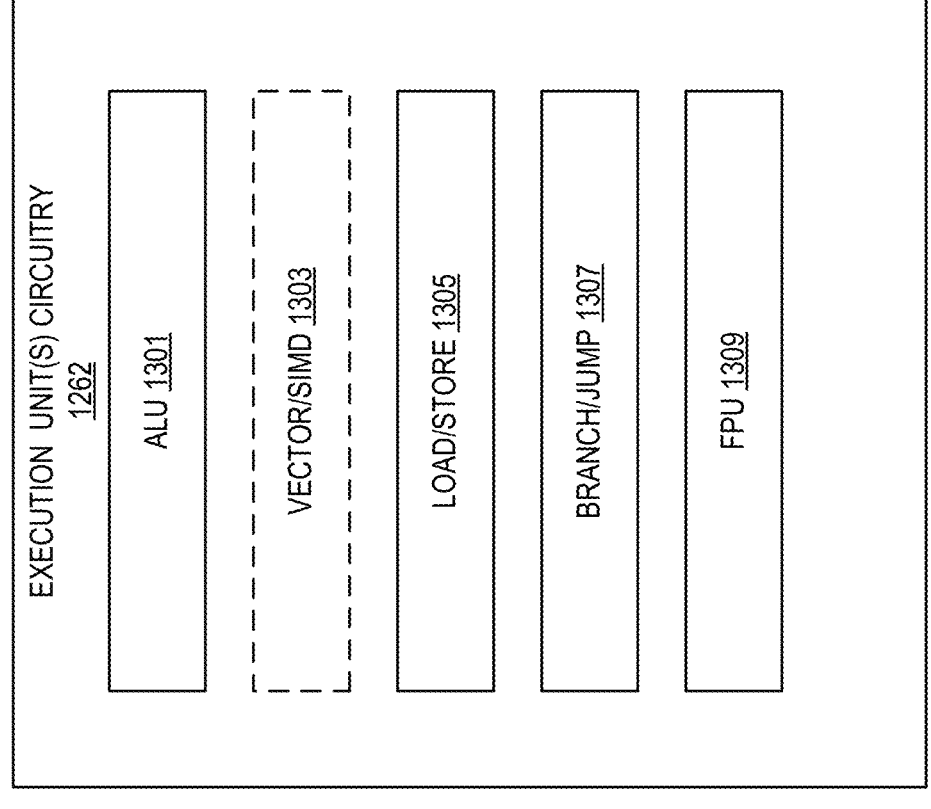
FIG. 13 illustrates examples of execution unit(s) circuitry.

FIG. 13 illustrates examples of execution unit(s) circuitry, such as execution unit(s) circuitry 1262 of FIG. 12B. As illustrated, execution unit(s) circuity 1262 may include one or more ALU circuits 1301, optional vector/single instruction multiple data (SIMD) circuits 1303, load/store circuits 1305, branch/jump circuits 1307, and/or Floating-point unit (FPU) circuits 1309. ALU circuits 1301 perform integer arithmetic and/or Boolean operations. Vector/SIMD circuits 1303 perform vector/SIMD operations on packed data (such as SIMD/vector registers). Load/store circuits 1305 execute load and store instructions to load data from memory into registers or store from registers to memory. Load/store circuits 1305 may also generate addresses. Branch/jump circuits 1307 cause a branch or jump to a memory address depending on the instruction. FPU circuits 1309 perform floating-point arithmetic. The width of the execution unit(s) circuitry 1362 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture.

FIG. 14 is a block diagram of a register architecture 1400 according to some examples. As illustrated, the register architecture 1400 includes vector/SIMD registers 1410 that vary from 128-bit to 1,024 bits width. In some examples, the vector/SIMD registers 1410 are physically 512-bits and, depending upon the mapping, only some of the lower bits are used. For example, in some examples, the vector/SIMD registers 1410 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1400 includes writemask/predicate registers 1415. For example, in some examples, there are 8 writemask/predicate registers (sometimes called k0 through k7) that are each 16-bit, 32-bit, 64-bit, or 128-bit in size. Writemask/predicate registers 1415 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1415 corresponds to a data element position of the destination. In other examples, the writemask/predicate registers 1415 are scalable and consists of a set number of enable bits for a given vector element (e.g., 8 enable bits per 64-bit vector element).

The register architecture 1400 includes a plurality of general-purpose registers 1425. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1400 includes scalar floating-point (FP) register 1445 which is used for scalar floating-point operations on 32/64/80-bit floating-point data using the x87 instruction set architecture extension or as MMX registers to perform operations on 64-bit packed integer data, as well as to hold operands for some operations performed between the MMX and XMIM registers.

One or more flag registers 1440 (e.g., EFLAGS, RFLAGS, etc.) store status and control information for arithmetic, compare, and system operations. For example, the one or more flag registers 1440 may store condition code information such as carry, parity, auxiliary carry, zero, sign, and overflow. In some examples, the one or more flag registers 1440 are called program status and control registers.

Segment registers 1420 contain segment points for use in accessing memory. In some examples, these registers are referenced by the names CS, DS, SS, ES, FS, and GS.

Machine specific registers (MSRs) 1435 control and report on processor performance. Most MSRs 1435 handle system-related functions and are not accessible to an application program. Machine check registers 1460 consist of control, status, and error reporting MSRs that are used to detect and report on hardware errors.

One or more instruction pointer register(s) 1430 store an instruction pointer value. Control register(s) 1455 (e.g., CR0-CR4) determine the operating mode of a processor (e.g., processor 970, 980, 938, 915, and/or multiprocessor system 1000) and the characteristics of a currently executing task. Debug registers 1450 control and allow for the monitoring of a processor or core's debugging operations.

Memory (mem) management registers 1465 specify the locations of data structures used in protected mode memory management. These registers may include a GDTR, IDTR, task register, and a LDTR register.

Alternative examples may use wider or narrower registers. Additionally, alternative examples may use more, less, or different register files and registers. The register architecture 1400 may, for example, be used in register file/memory 408, or physical register file(s) circuitry 1258.
Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.
Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 16:
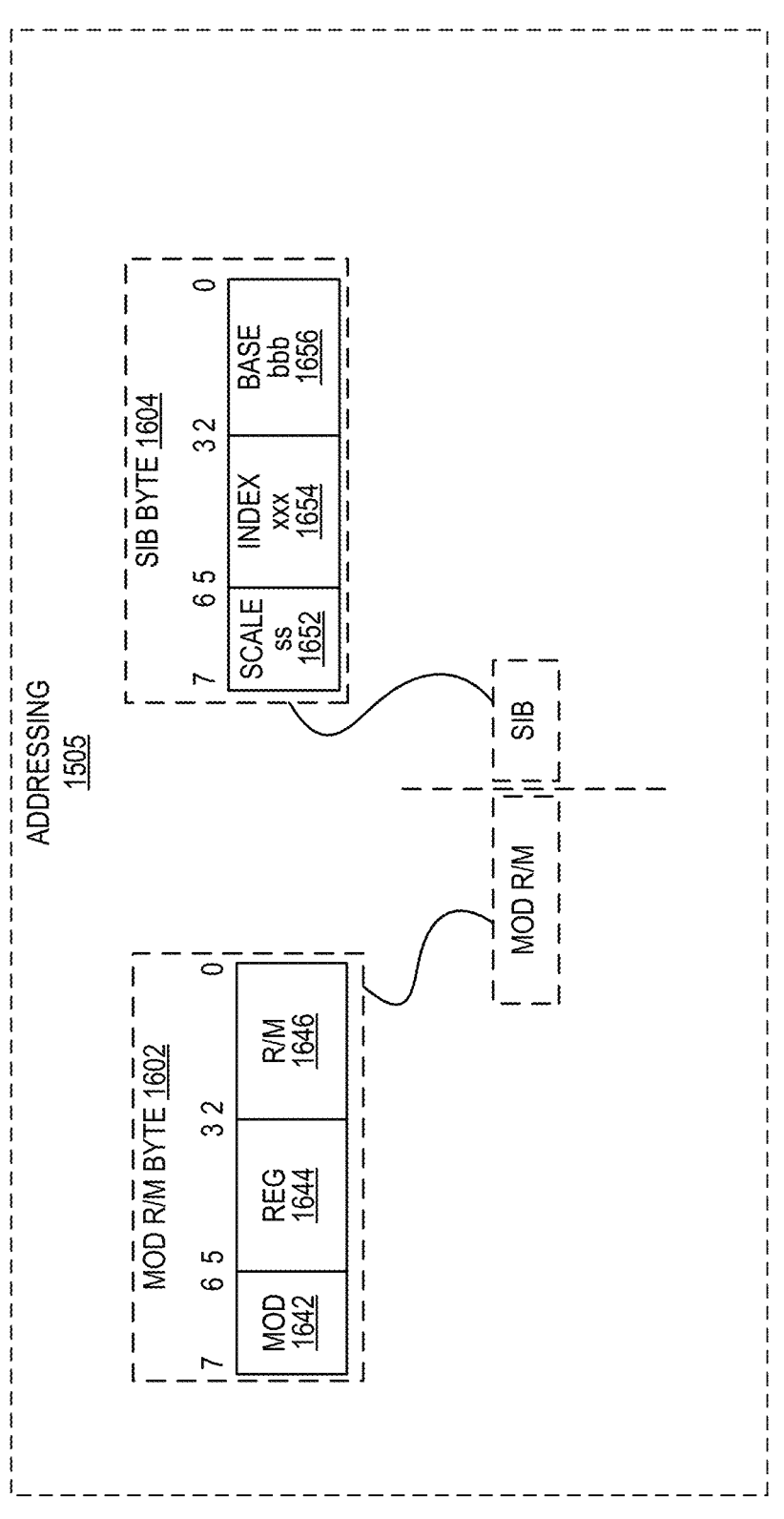
FIG. 16 illustrates examples of an addressing field.

FIG. 16 illustrates examples of an instruction format. As illustrated, an instruction may include multiple components including, but not limited to, one or more fields for: one or more prefixes 1501, an opcode 1503, addressing information 1505 (e.g., register identifiers, memory addressing information, etc.), a displacement value 1507, and/or an immediate value 1509. Note that some instructions utilize some or all the fields of the format whereas others may only use the field for the opcode 1503. In some examples, the order illustrated is the order in which these fields are to be encoded, however, it should be appreciated that in other examples these fields may be encoded in a different order, combined, etc.

The prefix(es) field(s) 1501, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1503 is used to at least partially define the operation to be performed upon a decoding of the instruction. In some examples, a primary opcode encoded in the opcode field 1503 is one, two, or three bytes in length. In other examples, a primary opcode can be a different length. An additional 3-bit opcode field is sometimes encoded in another field.

The addressing field 1505 is used to address one or more operands of the instruction, such as a location in memory or one or more registers. FIG. 16 illustrates examples of the addressing field 1505. In this illustration, an optional ModR/M byte 1602 and an optional Scale, Index, Base (SIB) byte 1604 are shown. The ModR/M byte 1602 and the SIB byte 1604 are used to encode up to two operands of an instruction, each of which is a direct register or effective memory address. Note that each of these fields are optional in that not all instructions include one or more of these fields. The MOD R/M byte 1602 includes a MOD field 1642, a register (reg) field 1644, and R/M field 1646.

The content of the MOD field 1642 distinguishes between memory access and non-memory access modes. In some examples, when the MOD field 1642 has a binary value of 11 (11b), a register-direct addressing mode is utilized, and otherwise register-indirect addressing is used.

The register field 1644 may encode either the destination register operand or a source register operand or may encode an opcode extension and not be used to encode any instruction operand. The content of register index field 1644, directly or through address generation, specifies the locations of a source or destination operand (either in a register or in memory). In some examples, the register field 1644 is supplemented with an additional bit from a prefix (e.g., prefix 1501) to allow for greater addressing.

The R/M field 1646 may be used to encode an instruction operand that references a memory address or may be used to encode either the destination register operand or a source register operand. Note the R/M field 1646 may be combined with the MOD field 1642 to dictate an addressing mode in some examples.

The SIB byte 1604 includes a scale field 1652, an index field 1654, and a base field 1656 to be used in the generation of an address. The scale field 1652 indicates scaling factor. The index field 1654 specifies an index register to use. In some examples, the index field 1654 is supplemented with an additional bit from a prefix (e.g., prefix 1501) to allow for greater addressing. The base field 1656 specifies a base register to use. In some examples, the base field 1656 is supplemented with an additional bit from a prefix (e.g., prefix 1501) to allow for greater addressing. In practice, the content of the scale field 1652 allows for the scaling of the content of the index field 1654 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1507 provides this value. Additionally, in some examples, a displacement factor usage is encoded in the MOD field of the addressing field 1505 that indicates a compressed displacement scheme for which a displacement value is calculated and stored in the displacement field 1507.

In some examples, an immediate field 1509 specifies an immediate value for the instruction. An immediate value may be encoded as a 1-byte value, a 2-byte value, a 4-byte value, etc.

Figures 17, 18A, 18B, 18C, 18D:
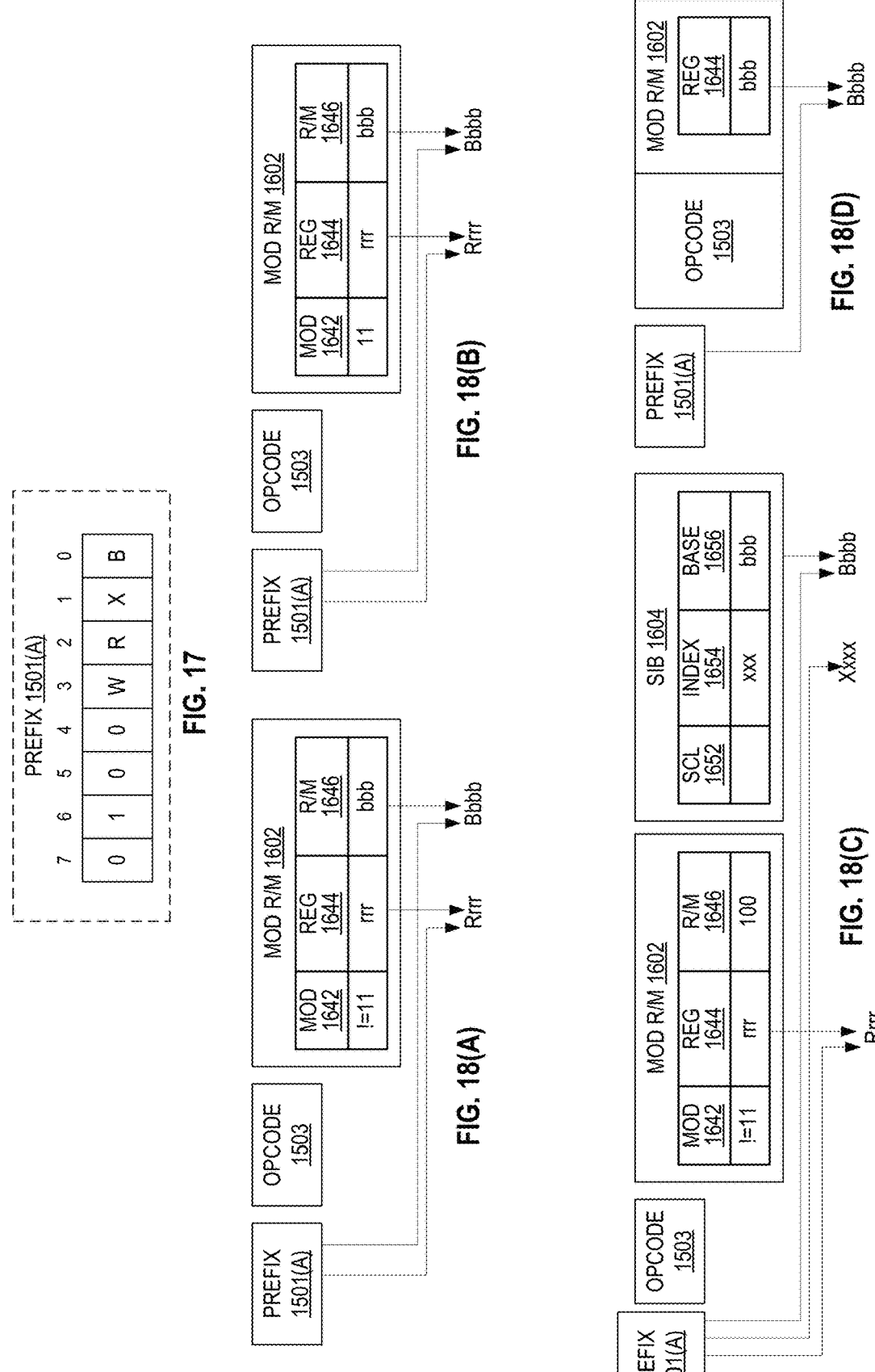
FIG. 17 illustrates examples of a first prefix.
FIGS. 18A-18D illustrate examples of how the R, X, and B fields of the first prefix in FIG. 17 are used.

FIG. 17 illustrates examples of a first prefix 1501(A). In some examples, the first prefix 1501(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1501(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1501(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1544 and MOD R/M R/M field 1546 alone can each only address 8 registers.

In the first prefix 1501(A), bit position 2 (R) may be an extension of the MOD R/M reg field 1444 and may be used to modify the ModR/M reg field 1444 when that field encodes a general-purpose register, a 64-bit packed data register (e.g., a SSE register), or a control or debug register. R is ignored when Mod R/M byte 1402 specifies other registers or defines an extended opcode.

Bit position 1 (X) may modify the SIB byte index field 1454.

Bit position 0 (B) may modify the base in the Mod R/M R/M field 1446 or the SIB byte base field 1456; or it may modify the opcode register field used for accessing general purpose registers (e.g., general purpose registers 1425).

FIGS. 18A-D illustrate examples of how the R, X, and B fields of the first prefix 1501(A) are used. FIG. 18A illustrates R and B from the first prefix 1501(A) being used to extend the reg field 1544 and R/M field 1546 of the MOD R/M byte 1502 when the SIB byte 1604 is not used for memory addressing. FIG. 18B illustrates R and B from the first prefix 1501(A) being used to extend the reg field 1544 and R/M field 1546 of the MOD R/M byte 1502 when the SIB byte 1604 is not used (register-register addressing). FIG. 18C illustrates R, X, and B from the first prefix 1501(A) being used to extend the reg field 1544 of the MOD R/M byte 1502 and the index field 1554 and base field 1556 when the SIB byte 1604 being used for memory addressing. FIG. 18D illustrates B from the first prefix 1501(A) being used to extend the reg field 1544 of the MOD R/M byte 1502 when a register is encoded in the opcode 1503.

Figures 19A, 19B:
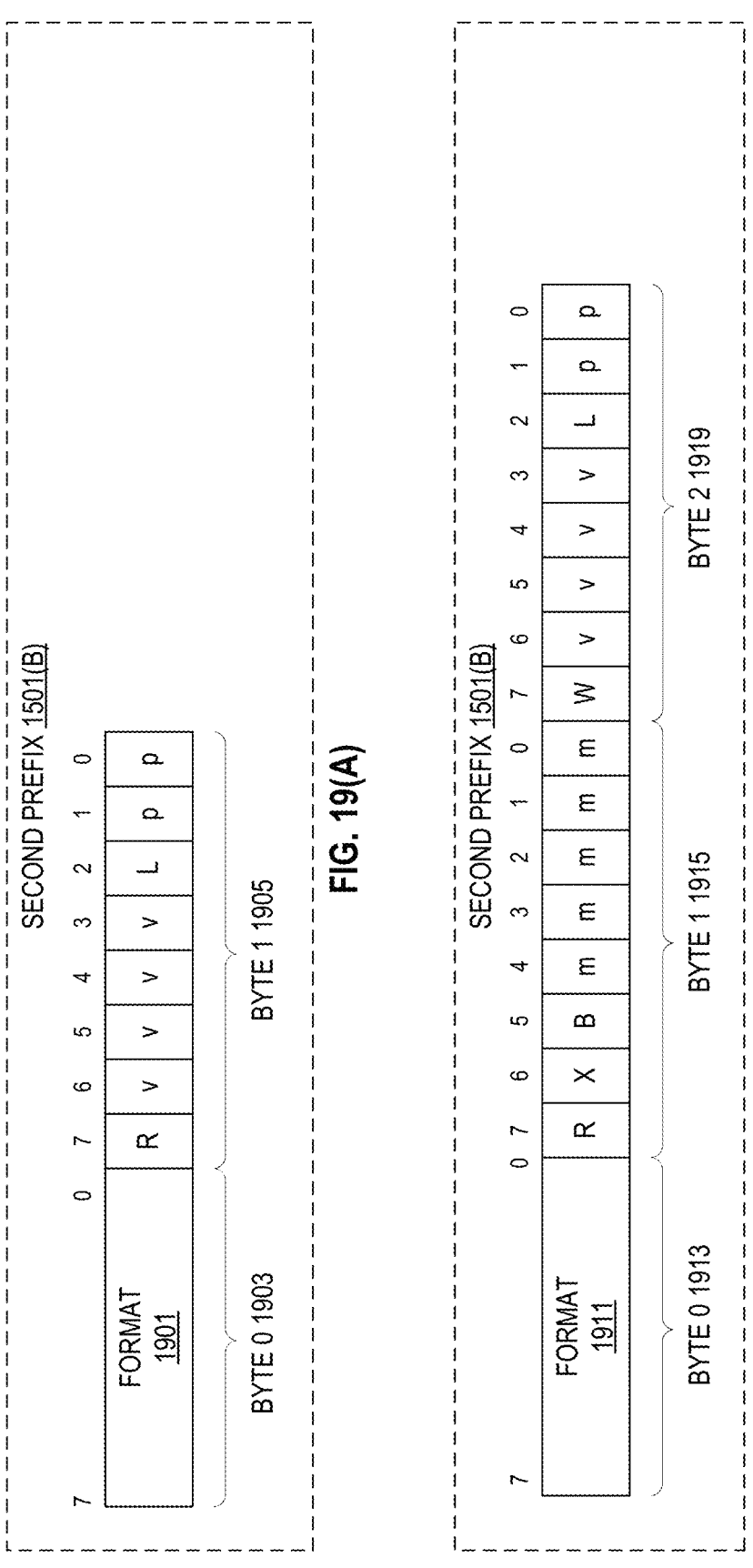
FIGS. 19A-B illustrate examples of a second prefix.

FIGS. 19A-B illustrate examples of a second prefix 1501 (B). In some examples, the second prefix 1501(B) is an example of a VEX prefix. The second prefix 1501(B) encoding allows instructions to have more than two operands, and allows SIMD vector registers (e.g., vector/SIMD registers 1410) to be longer than 64-bits (e.g., 128-bit and 256-bit). The use of the second prefix 1501(B) provides for three-operand (or more) syntax. For example, previous two-operand instructions performed operations such as A=A+B, which overwrites a source operand. The use of the second prefix 1501(B) enables operands to perform nondestructive operations such as A=B+C.

In some examples, the second prefix 1501(B) comes in two forms—a two-byte form and a three-byte form. The two-byte second prefix 1501(B) is used mainly for 128-bit, scalar, and some 256-bit instructions; while the three-byte second prefix 1501(B) provides a compact replacement of the first prefix 1501(A) and 3-byte opcode instructions.

FIG. 19A illustrates examples of a two-byte form of the second prefix 1501(B). In one example, a format field 1901 (byte 0 1903) contains the value C5H. In one example, byte 1 1905 includes a "R" value in bit[7]. This value is the complement of the "R" value of the first prefix 1501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1 s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446 and the Mod R/M reg field 1444 encode three of the four operands. Bits[7:4] of the immediate 1509 are then used to encode the third source register operand.

FIG. 19B illustrates examples of a three-byte form of the second prefix 1501(B). In one example, a format field 1811 (byte 0 1813) contains the value C4H. Byte 1 1915 includes in bits[7:5] "R," "X," and "B" which are the complements of the same values of the first prefix 1501(A). Bits[4:0] of byte 1 1915 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1917 is used similar to W of the first prefix 1501(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1 s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1509 are then used to encode the third source register operand.

Figure 20:
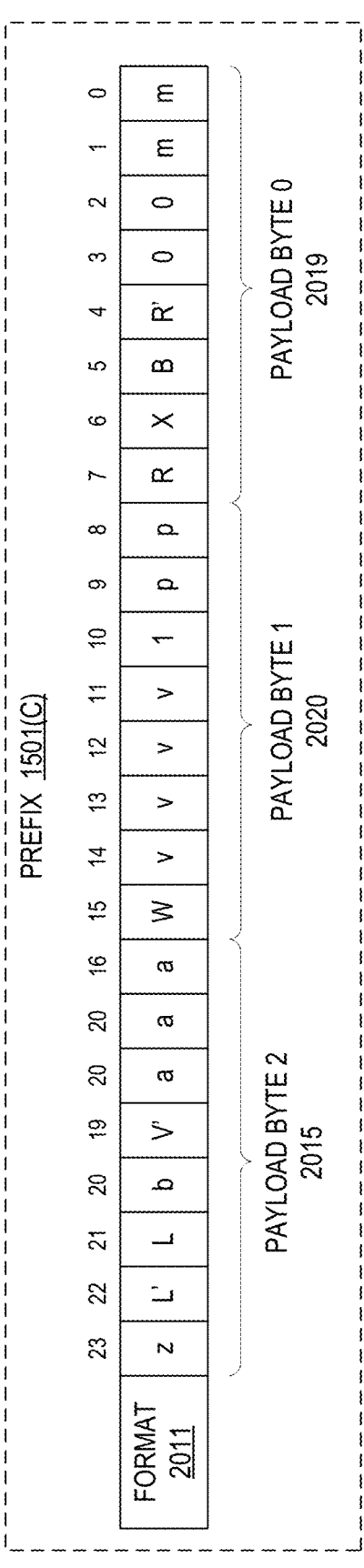
FIG. 20 illustrates examples of a third prefix.

FIG. 20 illustrates examples of a third prefix 1501(C). In some examples, the first prefix 1501(A) is an example of an EVEX prefix. The third prefix 1501(C) is a four-byte prefix.

The third prefix 1501(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 14) or predication utilize this prefix. Opmask register allow for conditional processing or selection control. Opmask instructions, whose source/destination operands are opmask registers and treat the content of an opmask register as a single value, are encoded using the second prefix 1501(B).

The third prefix 1501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1501(C) is a format field 2011 that has a value, in one example, of 62H. Subsequent bytes are referred to as payload bytes 2015-2019 and collectively form a 24-bit value of P[23:0] providing specific capability in the form of one or more fields (detailed herein).

In some examples, P[1:0] of payload byte 2019 are identical to the low two mmmmm bits. P[3:2] are reserved in some examples. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1 s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1501(A) and second prefix 1511(B) and may serve as an opcode extension bit or operand size promotion.

P[18:16] specify the index of a register in the opmask (writemask) registers (e.g., writemask/predicate registers 1415). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1501(C) are detailed in the following tables.

TABLE 11

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |

TABLE 11-continued

| | | | | |
|---|---|---|---|---|
| 32-Register Support in 64-bit Mode | | | | |
| | 4 | 3 | [2:0] | REG. TYPE | COMMON USAGES |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 12

| | | | |
|---|---|---|---|
| Encoding Register Specifiers in 32-bit Mode | | | |
| | [2:0] | REG. TYPE | COMMON USAGES |
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 13

| | | | |
|---|---|---|---|
| Opmask Register Specifier Encoding | | | |
| | [2:0] | REG. TYPE | COMMON USAGES |
| REG | ModR/M Reg | k0-k7 | Source |
| VVVV | vvvv | k0-k7 | $2^{nd}$ Source |
| RM | ModR/M R/M | k0-k7 | $1^{st}$ Source |
| {k1] | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 21 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 21 shows a program in a high-level language 2102 may be compiled using a first ISA compiler 2104 to generate first ISA binary code 2106 that may be natively executed by a processor with at least one first instruction set architecture core 2116. The processor with at least one first ISA instruction set architecture core 2116 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 2104 represents a compiler that is operable to generate first ISA binary code 2106 (e.g., object code) that can, with or without additional linkage processing, be executed on the processor with at least one first ISA instruction set architecture core 2116. Similarly, FIG. 21 shows the program in the high-level language 2102 may be compiled using an alternative instruction set architecture compiler 2108 to generate alternative instruction set architecture binary code 2110 that may be natively executed by a processor without a first ISA instruction set architecture core 2114. The instruction converter 2112 is used to convert the first ISA binary code 2106 into code that may be natively executed by the processor without a first ISA instruction set architecture core 2114. This converted code is not necessarily to be the same as the alternative instruction set architecture binary code 2110; however, the converted code will accomplish the general operation and be made up of instructions from the alternative instruction set architecture. Thus, the instruction converter 2112 represents software, firmware, hardware, or a combination thereof that, through emulation, simulation or any other process, allows a processor or other electronic device that does not have a first ISA instruction set architecture processor or core to execute the first ISA binary code 2106.

Techniques and architectures for instructions for min-max operations are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description.

Additional Notes and Examples

Example 1 is an apparatus including decoder circuitry to decode a runtime call instruction, the runtime call instruction to include a field for an opcode, the opcode to indicate execution circuitry is to perform a runtime call operation; and execution circuitry to execute the runtime call instruction according to the opcode to perform the runtime call operation to: execute a "no operation" when a runtime call destination equals a predetermined value; and execute an indirect call with the runtime call destination as a destination address when the runtime call destination does not equal the predetermined value.

In Example 2, the subject matter of Example 1 may optionally include a predetermined register to store the runtime call destination. In Example 3, the subject matter of Example 1 may optionally include the apparatus to execute instructions of an instrumentation handler starting at the destination address. In Example 4, the subject matter of Example 3 may optionally include the execution circuitry to perform the runtime call operation at a same privilege level as an application when the runtime call instruction is invoked from the instrumentation handler in user mode. In Example 5, the subject matter of Example 1 may optionally include the apparatus to execute instructions of a memory check handler starting at the destination address. In Example 6, the subject matter of Example 1 may optionally include the execution circuitry to disable instrumentation when the runtime call destination equals the predetermined value.

In Example 7, the subject matter of Example 1 may optionally include wherein the predetermined value is zero. In Example 8, the subject matter of Example 1 may optionally include wherein the predetermined value is a known invalid memory address. In Example 9, the subject matter of Example 3 may optionally include the execution circuitry to execute the runtime call instruction according to the opcode to perform the runtime call operation to set a runtime return destination to an address of a next instruction after the runtime call instruction and set an instruction pointer to the runtime call destination when the runtime call destination does not equal the predetermined value. In Example 10, the subject matter of Example 9 may optionally include the decoder circuitry to decode a runtime return instruction, the runtime return instruction to include a field for an opcode, the opcode to indicate execution circuitry is to perform a runtime return operation; and execution circuitry to execute the runtime return instruction according to the opcode to perform the runtime return operation to generate an exception when a runtime call destination equals a predetermined value; and set an instruction pointer to the runtime return destination and set the runtime return destination to the predetermined value when the runtime return destination does not equal the predetermined value.

In Example 11, the subject matter of Example 1 may optionally include a pair of registers to store a corresponding pair of destination addresses, wherein a first register of the pair is for a user mode and a second register of the pair is for a supervisor mode. In Example 12, the subject matter of Example 1 may optionally include the execution circuitry to execute the runtime call instruction according to the opcode to perform the runtime call operation to generate a random value when the runtime call destination does not equal the predetermined value; set a runtime return destination to an address of a next instruction after the runtime call instruction and set an instruction pointer to the runtime call destination when the random value is less than a range of the random value multiplied by a desired probability of executing a plurality of runtime call instructions; and execute "a no operation" when the random value is not less than the range. In Example 13, the subject matter of Example 1 may optionally include wherein the runtime call instruction to include a field for an immediate operand, the immediate operand to indicate a selected register to store the destination address. In Example 14, the subject matter of Example 1 may optionally include wherein the runtime call instruction to include a field for an immediate operand, the immediate operand to indicate a selected register to store the destination address, the apparatus to execute instructions of a corresponding instrumentation handler starting at the destination address indicated by the selected register.

Example 15 is a method including fetching an instruction having fields for an opcode, the opcode indicating a runtime call operation; decoding the instruction according to the opcode; scheduling execution of the instruction; and executing the decoded instruction to execute a "no operation" when a runtime call destination equals a predetermined value; and execute an indirect call with the runtime call destination as a destination address when the runtime call destination does not equal the predetermined value.

In Example 16, the subject matter of Example 15 may optionally include storing the runtime call destination in a predetermined register. In Example 17, the subject matter of Example 15 may optionally include executing instructions of an instrumentation handler starting at the destination address. In Example 18, the subject matter of Example 17 may optionally include executing the instruction at a same privilege level as an application when the runtime call instruction is invoked from the instrumentation handler in user mode. In Example 19, the subject matter of Example 15 may optionally include executing instructions of a memory check handler starting at the destination address. In Example 20, the subject matter of Example 15 may optionally include disabling instrumentation when the runtime call destination equals the predetermined value. In Example 21, the subject matter of Example 15 may optionally include wherein the predetermined value is zero. In Example 22, the subject matter of Example 15 may optionally include wherein the predetermined value is a known invalid memory address. In Example 23, the subject matter of Example 15 may optionally include performing the runtime call operation to set a runtime return destination to an address of a next instruction after the instruction and set an instruction pointer to the runtime call destination when the runtime call destination does not equal the predetermined value. In Example 24, the subject matter of Example 23 may optionally include fetching and decoding a runtime return instruction, the runtime return instruction to include a field for an opcode, the opcode to indicate execution circuitry is to perform a runtime return operation; and executing the runtime return instruction according to the opcode to perform the runtime return operation to generate an exception when a runtime call destination equals a predetermined value; and set an instruction pointer to the runtime return destination and set the runtime return destination to the predetermined value when the runtime return destination does not equal the predetermined value.

Example 25 is a system, including a memory to store a runtime call instruction; and a processor coupled to the memory, the processor to execute the runtime call instruction to execute a "no operation" when a runtime call destination equals a predetermined value; and execute an indirect call with the runtime call destination as a destination address when the runtime call destination does not equal the predetermined value. In Example 26, the subject matter of Example may optionally include a predetermined register to store the runtime call destination. In Example 27, the subject matter of Example 25 may optionally include the processor to execute instructions of an instrumentation handler starting at the destination address in the memory. In Example 28, the subject matter of Example 27 may optionally include the processor to execute the runtime call instruction at a same privilege level as an application when the runtime call instruction is invoked from the instrumentation handler in user mode. In Example 29, the subject matter of Example 25 may optionally include the processor to execute instructions of a memory check handler starting at the destination address in the memory. In Example 30, the subject matter of Example 25 may optionally include the processor to disable instrumentation when the runtime call destination equals the predetermined value.

Example 31 is an apparatus operative to perform the method of any one of Examples to 24. Example 32 is an apparatus that includes means for performing the method of any one of Examples 15 to 24. Example 33 is an apparatus that includes any combination of modules and/or units and/or logic and/or circuitry and/or means operative to perform the method of any one of Examples 15 to 24. Example 34 is an optionally non-transitory and/or tangible machine-readable medium, which optionally stores or otherwise provides instructions that if and/or when executed by a computer system or other machine are operative to cause the machine to perform the method of any one of Examples 15 to 24.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:

decoder circuitry to decode a runtime call instruction, the runtime call instruction to include a field for a first opcode, the first opcode to indicate execution circuitry is to perform a runtime call operation; and the execution circuitry to execute the runtime call instruction according to the first opcode to perform the runtime call operation to:

execute a "no operation" when a runtime call destination equals a predetermined value; and execute an indirect call with the runtime call destination as a destination address when the runtime call destination does not equal the predetermined value.

2. The apparatus of claim 1, comprising a predetermined register to store the runtime call destination.

3. The apparatus of claim 1, wherein the execution circuitry is also to execute instructions of an instrumentation handler starting at the destination address.

4. The apparatus of claim 3, wherein the execution circuitry is also to perform the runtime call operation at a same privilege level as an application when the runtime call instruction is invoked from the instrumentation handler in user mode.

5. The apparatus of claim 1, wherein the execution circuitry is also to execute instructions of a memory check handler starting at the destination address.

6. The apparatus of claim 1, wherein the execution circuitry is also to disable instrumentation when the runtime call destination equals the predetermined value.

7. The apparatus of claim 1, wherein the predetermined value is zero.

8. The apparatus of claim 1, wherein the predetermined value is a known invalid memory address.

9. The apparatus of claim 1, wherein the execution circuitry is also to execute the runtime call instruction according to the first opcode to perform the runtime call operation to set a runtime return destination to an address of a next instruction after the runtime call instruction and set an instruction pointer to the runtime call destination when the runtime call destination does not equal the predetermined value.

10. The apparatus of claim 9, wherein the decoder circuitry is also to decode a runtime return instruction, the runtime return instruction to include a field for a second opcode, the second opcode to indicate the execution circuitry is to perform a runtime return operation; and the execution circuitry is also to execute the runtime return instruction according to the second opcode to perform the runtime return operation to generate an exception when the runtime call destination equals the predetermined value; and set an instruction pointer to the runtime return destination and set the runtime return destination to the predetermined value when the runtime return destination does not equal the predetermined value.

11. The apparatus of claim 1, comprising a pair of registers to store a corresponding pair of destination addresses, wherein a first register of the pair is for a user mode and a second register of the pair is for a supervisor mode.

12. The apparatus of claim 1, wherein the execution circuitry is also to execute the runtime call instruction according to the first opcode to perform the runtime call operation to:

generate a random value when the runtime call destination does not equal the predetermined value;

set a runtime return destination to an address of a next instruction after the runtime call instruction and set an instruction pointer to the runtime call destination when the random value is less than a range of the random value multiplied by a desired probability of executing a plurality of runtime call instructions; and execute "a no operation" when the random value is not less than the range.

13. The apparatus of claim 1, wherein the runtime call instruction is to include a field for an immediate operand, the immediate operand to indicate a selected register to store the destination address.

14. The apparatus of claim 1, wherein the runtime call instruction is to include a field for an immediate operand, the immediate operand to indicate a selected register to store the destination address, and the execution circuitry is also to execute instructions of a corresponding instrumentation handler starting at the destination address indicated by the selected register.

15. A method, comprising:

fetching an instruction having a field for a first opcode, the first opcode indicating a runtime call operation;

decoding the instruction according to the first opcode;

scheduling execution of the instruction; and executing the decoded instruction to:

execute a "no operation" in response to a runtime call destination being equal to a predetermined value; and execute an indirect call with the runtime call destination as a destination address in response to the runtime call destination not being equal the predetermined value.

16. The method of claim 15, comprising storing the runtime call destination in a predetermined register.

17. The method of claim 15, comprising executing instructions of an instrumentation handler starting at the destination address.

18. The method of claim 17, comprising executing the instruction at a same privilege level as an application when the instruction is invoked from the instrumentation handler in user mode.

19. The method of claim 15, comprising executing instructions of a memory check handler starting at the destination address.

20. The method of claim 15, comprising disabling instrumentation when the runtime call destination equals the predetermined value.

21. The method of claim 15, wherein the predetermined value is zero.

22. The method of claim 15, wherein the predetermined value is a known invalid memory address.

23. The method of claim 15, comprising performing the runtime call operation to set a runtime return destination to an address of a next instruction after the instruction and set an instruction pointer to the runtime call destination when the runtime call destination does not equal the predetermined value.

24. The method of claim 23, comprising fetching and decoding a runtime return instruction, the runtime return instruction to include a field for a second opcode, the second opcode to indicate execution circuitry is to perform a runtime return operation; and executing the runtime return instruction according to the second opcode to perform the runtime return operation to generate an exception when the runtime call destination equals the predetermined value; and set an instruction pointer to the runtime return destination and set the runtime return destination to the predetermined value when the runtime return destination does not equal the predetermined value.

25. A system, comprising:

a memory to store a runtime call instruction; and a processor coupled to the memory, the processor to execute the runtime call instruction to execute a "no operation" when a runtime call destination equals a predetermined value; and execute an indirect call with the runtime call destination as a destination address when the runtime call destination does not equal the predetermined value.

26. The system of claim 25, comprising a predetermined register to store the runtime call destination.

27. The system of claim 25, wherein the processor is also to execute instructions of an instrumentation handler starting at the destination address.

28. The system of claim 27, wherein the processor is also to execute the runtime call instruction at a same privilege level as an application when the runtime call instruction is invoked from the instrumentation handler in user mode.

29. The system of claim 25, wherein the processor is also to execute instructions of a memory check handler starting at the destination address.

30. The system of claim 25, wherein the processor is also to disable instrumentation when the runtime call destination equals the predetermined value.

\* \* \* \* \*